US012597111B2

(12) United States Patent　　　　　(10) Patent No.:　US 12,597,111 B2
Chowhan et al.　　　　　　　　　　　　(45) Date of Patent:　　　Apr. 7, 2026

(54) SYSTEMS AND METHODS FOR DULL GRADING

(71) Applicants:US Synthetic Corporation, Orem, UT (US); Exo-Field Engineering Solutions PVT Ltd., Maharashtra (IN)

(72) Inventors: Tushar Chowhan, Maharashtra (IN); Brandon Paul Linford, Draper, UT (US); Scott Schmidt, Draper, UT (US)

(73) Assignees: US Synthetic Corporation, Orem, UT (US); Exo-Field Engineering Solutions PVT Ltd., Maharashtra (IN)

( * ) Notice:　Subject to any disclaimer, the term of this patent is extended or adjusted under 35 U.S.C. 154(b) by 205 days.

(21) Appl. No.:　18/561,926

(22) PCT Filed:　May 23, 2022

(86) PCT No.:　PCT/US2022/030520
§ 371 (c)(1),
(2) Date:　Nov. 17, 2023

(87) PCT Pub. No.: WO2022/251108
PCT Pub. Date: Dec. 1, 2022

(65)　　　　Prior Publication Data
US 2024/0242326 A1　　Jul. 18, 2024

Related U.S. Application Data

(60) Provisional application No. 63/192,710, filed on May 25, 2021.

(51) Int. Cl.
G06T 7/00　　　　(2017.01)
E21B 10/567　　　(2006.01)
(Continued)

(52) U.S. Cl.
CPC .......... G06T 7/0002 (2013.01); E21B 10/567 (2013.01); G06T 7/521 (2017.01);
(Continued)

(58) Field of Classification Search
None
See application file for complete search history.

(56)　　　　References Cited

U.S. PATENT DOCUMENTS 4,410,054 A　10/1983　Nagel et al.
4,560,014 A　12/1985　Geczy
　　　　　　　(Continued)

FOREIGN PATENT DOCUMENTS

CN　　104117876 A　10/2014
WO　2019087213 A1　　5/2019
WO　2020264479 A1　12/2020

OTHER PUBLICATIONS

International Search Report and Written Opinion for International Application No. PCT/US2022/030520 mailed Oct. 26, 2022.
(Continued)

*Primary Examiner* — Frank S Chen
(74) *Attorney, Agent, or Firm* — Ballard Spahr LLP

(57)　　　　ABSTRACT

Embodiments of the invention relate to automatically dull grading drill bits and portions thereof based on three-dimensional digital models made from one or more images of the drill bits taken at a drilling site by an electronic device with a time-of-flight camera, wherein a method for evaluating drill bits at a site of a drilling rig is disclosed. The method includes receiving, from a requestor, a plurality of images of a drill bit that has been used, at least some of the plurality of images including time-of-flight images that have been captured by an electronic device (e.g., a computing device, an electronic device, etc.) on-site at or near a drill rig. The method includes generating a digital model of the drill bit based on the plurality of images.

23 Claims, 8 Drawing Sheets

(51) Int. Cl.
  *G06T 7/521*     (2017.01)
  *G06T 17/00*     (2006.01)
(52) U.S. Cl.
  CPC .......... *G06T 17/00* (2013.01); *E21B 2200/20*
      (2020.05); *G06T 2207/10024* (2013.01); *G06T*
        *2207/10028* (2013.01); *G06T 2207/10152*
                          (2013.01)

(56)                References Cited

U.S. PATENT DOCUMENTS

| | | | |
|---|---|---|---|
| 5,364,192 | A | 11/1994 | Damm et al. |
| 5,368,398 | A | 11/1994 | Damm et al. |
| 5,480,233 | A | 1/1996 | Cunningham |
| 7,866,418 | B2 | 1/2011 | Bertagnolli et al. |
| 7,998,573 | B2 | 8/2011 | Qian et al. |
| 8,034,136 | B2 | 10/2011 | Sani |
| 8,236,074 | B1 | 8/2012 | Bertagnolli et al. |
| 2002/0094134 | A1 | 7/2002 | Nafis et al. |
| 2005/0190288 | A1 | 9/2005 | Yamada |
| 2006/0185899 | A1 | 8/2006 | Alft et al. |
| 2015/0287246 | A1 | 10/2015 | Huston et al. |
| 2017/0183915 | A1 | 6/2017 | Scott et al. |
| 2019/0145183 | A1 | 5/2019 | Potash |
| 2021/0279967 | A1* | 9/2021 | Gernoth ............... G06V 10/255 |
| 2021/0291276 | A1* | 9/2021 | Pelfrene ................ B33Y 10/00 |
| 2021/0358100 | A1* | 11/2021 | Lyles ........................ G06T 7/30 |
| 2022/0157014 | A1* | 5/2022 | Sevastopolskiy ......... G06T 7/11 |

OTHER PUBLICATIONS

U.S. Appl. No. 63/192,710, filed May 25, 2021.

* cited by examiner

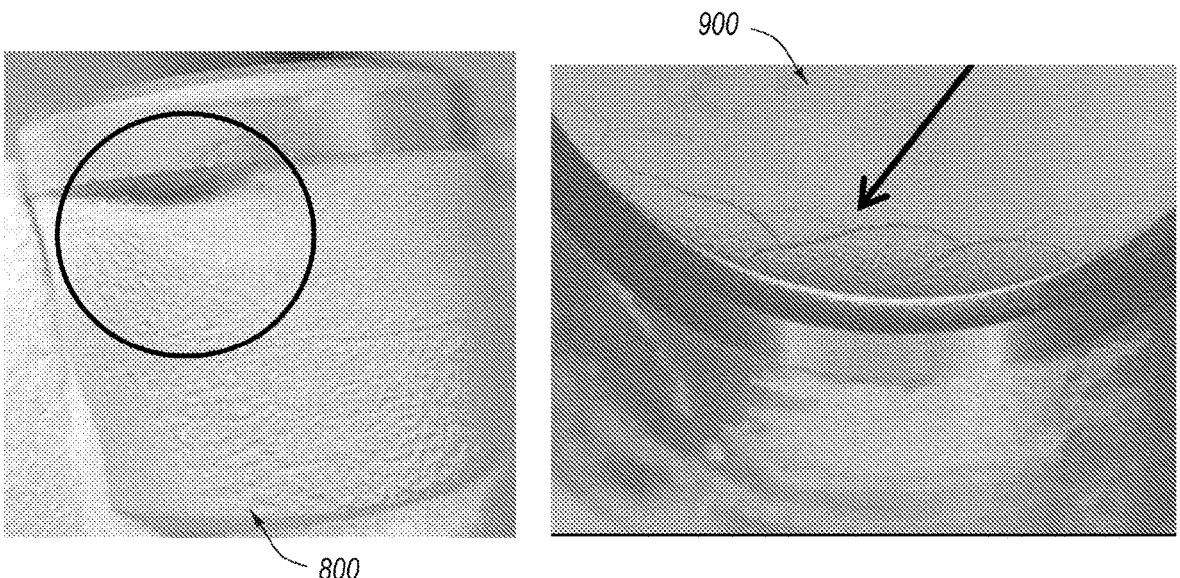
FIG. 8
FIG. 9
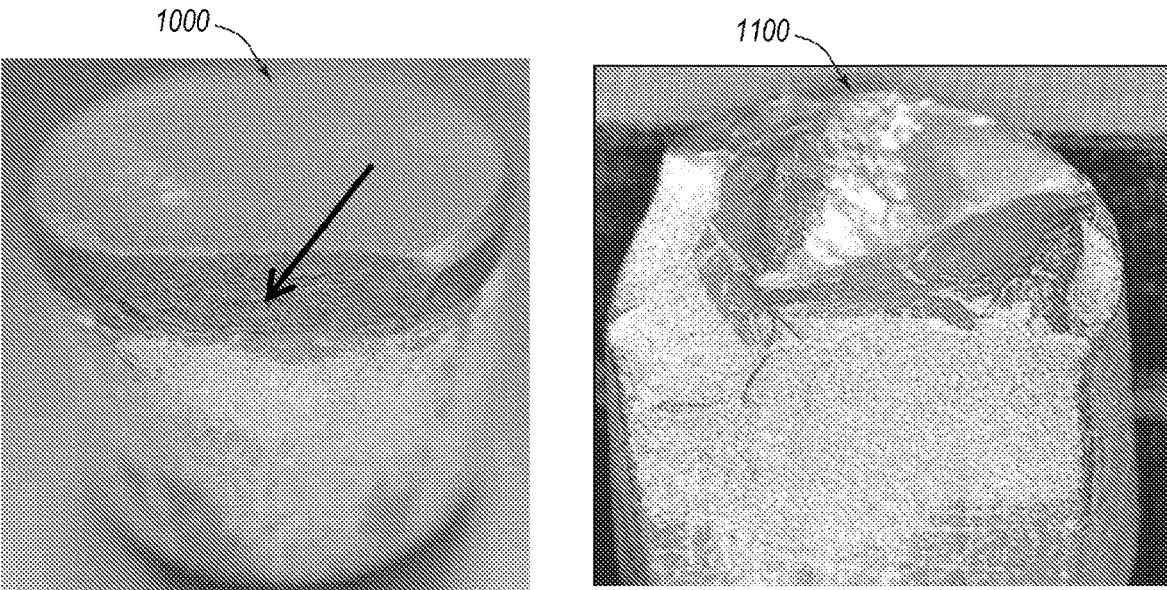
FIG. 10
FIG. 11

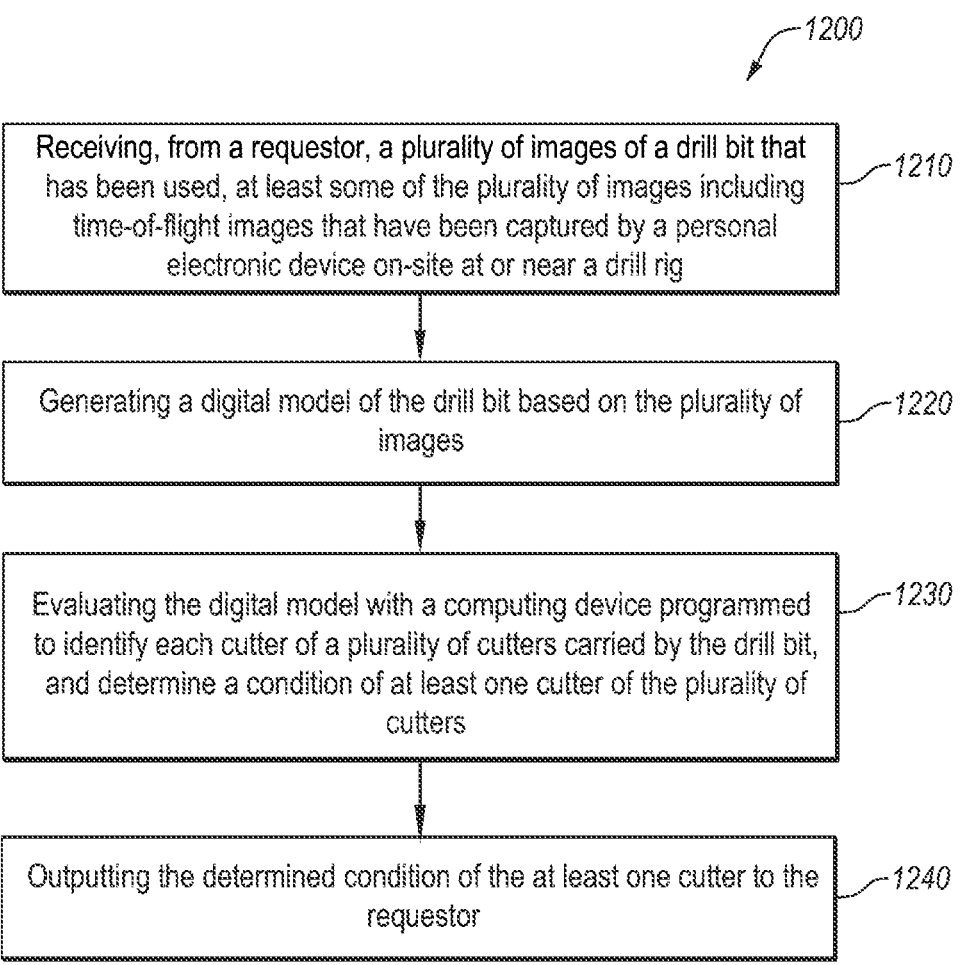

*1200*

Receiving, from a requestor, a plurality of images of a drill bit that has been used, at least some of the plurality of images including time-of-flight images that have been captured by a personal electronic device on-site at or near a drill rig
*1210*

Generating a digital model of the drill bit based on the plurality of images
*1220*

Evaluating the digital model with a computing device programmed to identify each cutter of a plurality of cutters carried by the drill bit, and determine a condition of at least one cutter of the plurality of cutters
*1230*

Outputting the determined condition of the at least one cutter to the requestor
*1240*

FIG. 12

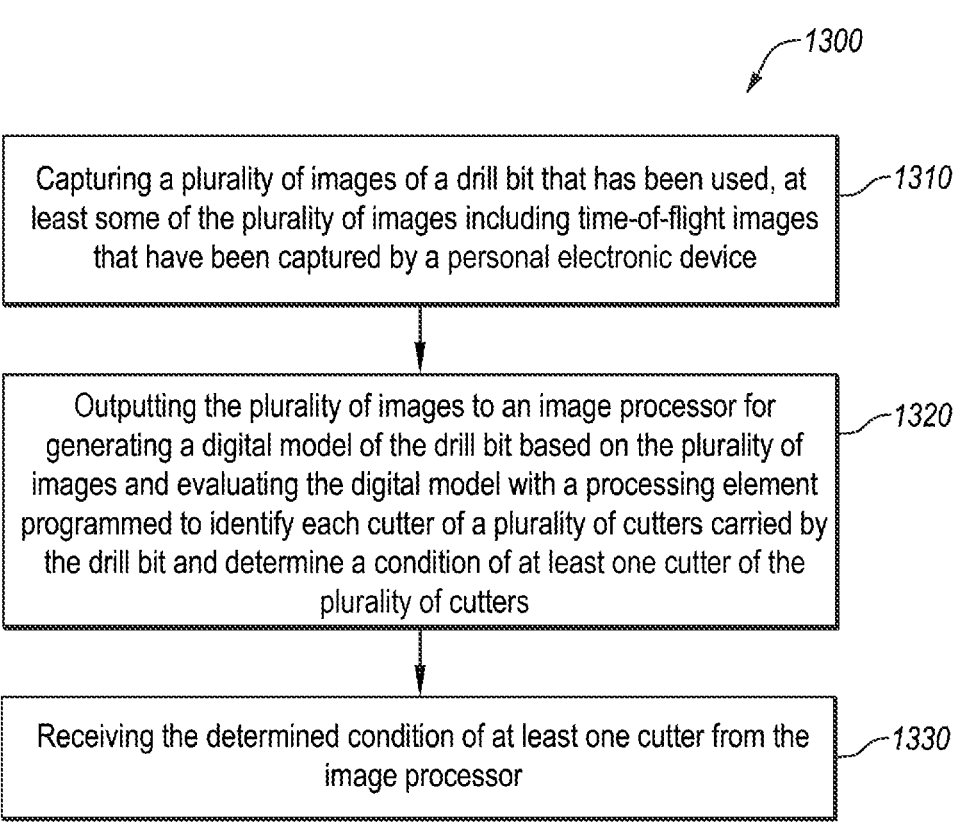

1300

Capturing a plurality of images of a drill bit that has been used, at least some of the plurality of images including time-of-flight images that have been captured by a personal electronic device — 1310

Outputting the plurality of images to an image processor for generating a digital model of the drill bit based on the plurality of images and evaluating the digital model with a processing element programmed to identify each cutter of a plurality of cutters carried by the drill bit and determine a condition of at least one cutter of the plurality of cutters — 1320

Receiving the determined condition of at least one cutter from the image processor — 1330

FIG. 13

SYSTEMS AND METHODS FOR DULL GRADING

CROSS-REFERENCE TO RELATED APPLICATION(S)

This application is a U.S. Nationalization of PCT International Application No. PCT/US2022/030520 filed May 23, 2022, which claims priority to U.S. Provisional Patent No. 63/192,710 filed on May 25, 2021, the disclosure of each of which is incorporated herein, in its entirety, by this reference.

BACKGROUND

Drilling systems and their assemblies typically include a drill bit, drill pipes, drill collars, stabilizers, reamers, bottom hole assembly ("BHA") components, and many others. Continuous, repetitive and cycled operation of the drilling components leads to wear and tear of the components, thus degrading the operation ability of the drilling assembly.

Drilling systems are employed for drilling wellbores into subterranean formations to retrieve hydrocarbon fluids, such as oil and natural gas. The drilling systems may comprise a drill string having a drill bit with a plurality of cutting elements which may be used to carry out the drilling operation. For example, a drill bit is rotated and advanced forward to cut through the formation to carry out the drilling operation. The drill string and drill bit may be used for successive drilling jobs. However, as the drill bit wears, breakage and drill bit failure may occur.

Typically, an engineer in the field may take a drill bit off-line to grade the drill and its associated components in order to determine if the drill bit can continue to be used or if the drill bit should be repaired, reconditioned or replaced. However, such dull grading is susceptible to the subjective biases of the engineer or field worker, variation of results between different individuals, limitations of human vision, and the like. Additionally, such dull grading is time consuming and takes up valuable time and human resources.

SUMMARY

Embodiments of the invention relate to systems and methods for evaluating drill bits or cutters thereon using time-of-flight images captured at the drill site with an electronic device.

In an embodiment, a method for evaluating drill bits at a site of a drilling rig is disclosed. The method includes receiving, from a requestor, a plurality of images of a drill bit that has been used, at least some of the plurality of images including time-of-flight images that have been captured by e an electronic device (e.g., a computing device, an electronic device, etc.) on-site at or near a drill rig. The method includes generating a digital model of the drill bit based on the plurality of images. The method includes evaluating the digital model with a computing device programmed to identify each cutter of a plurality of cutters carried by the drill bit and determine a condition of at least one cutter of the plurality of cutters. The method includes outputting the determined condition of the at least one cutter to the requestor.

In an embodiment, a method for evaluating drill bits at a site of a drilling rig is disclosed. The method includes capturing a plurality of images of a drill bit that has been used, at least some of the plurality of images including time-of-flight images that have been captured by an electronic device. The method includes outputting the plurality of images to an image processor for generating a digital model of the drill bit based on the plurality of images and evaluating the digital model with a processing element. The processing element is programmed to identify each cutter of a plurality of cutters carried by the drill bit and determine a condition of at least one cutter of the plurality of cutters. The method includes receiving the determined condition of at least one cutter from the image processor.

In an embodiment, a system for evaluating cutter wear at a site of a drilling rig is disclosed. The system includes a computing device having machine readable and executable instructions. The machine readable and executable instructions include instructions for receiving, from a requestor, a plurality of images of a drill bit that has been used, at least some of the plurality of images including time-of-flight images that have been captured by an electronic device (e.g., an electronic device) on-site at or near a drill rig. The machine readable and executable instructions include instructions for generating a digital model of the drill bit based on the plurality of images. The machine readable and executable instructions include instructions for evaluating the digital model with a computing device programmed to identify each cutter of a plurality of cutters carried by the drill bit and determine a condition of at least one cutter of the plurality of cutters. The machine readable and executable instructions include instructions for outputting the determined condition of the at least one cutter to the requestor.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

FIGS. 4-11 are photos of various failure modes of PDC cutters.

FIG. 12 is a flow chart of a method for evaluating drill bits at a site of a drilling rig, according to an embodiment.

FIG. 13 is a flow chart of a method for evaluating drill bits at a site of a drilling rig, according to an embodiment.

DETAILED DESCRIPTION

Embodiments of the invention relate to dull grading various tools or components, including drill bits and portions thereof, using three-dimensional digital models made from one or more images of the tool or component. For example, a three-dimensional model may be produced from one or more images of a drill bit taken at a drilling site by an electronic device having a time-of-flight camera.

For example, an electronic device, such as a cellular device, a mobile phone, camera, tablet, or other portable electronic device, having a range-detecting imaging device (e.g., a time-of-flight camera or a Lidar device—sometimes also known as LiDAR, LIDAR or LADAR—and generally referred to herein as a ranging imaging device), and/or another type of imaging device, may be used to capture images of a drill bit (or other components) on-site at a drill rig.

In some embodiments, the images may be sent to an off-site computing device having an image processor to build a three-dimensional model of the drill bit including the components thereof, such as the cutters on the drill bit. The depth information in the images produced by the ranging imaging device provides a greater amount of geometric detail and resolution between objects in the images than do, for example, color photos alone. The digital model is used to evaluate the condition of the drill bit, including the cutters thereon, to determine damage or wear states of the components of the drill bit and provide recommendations to the driller regarding the useful life of the drill bit. In some embodiments, the images may be processed directly by the onsite electronic device to build a model and to grade the cutters and/or other components of the drill bit.

The use of a portable electronic device (e.g., a cellphone or a tablet computer) with time-of-flight, Lidar or other ranging capabilities, in conjunction with the image processing techniques disclosed herein, may provide for readily available diagnosis of damage states and/or wear states of drill bits and cutters thereon, for use by drillers on-site.

Figure 1:
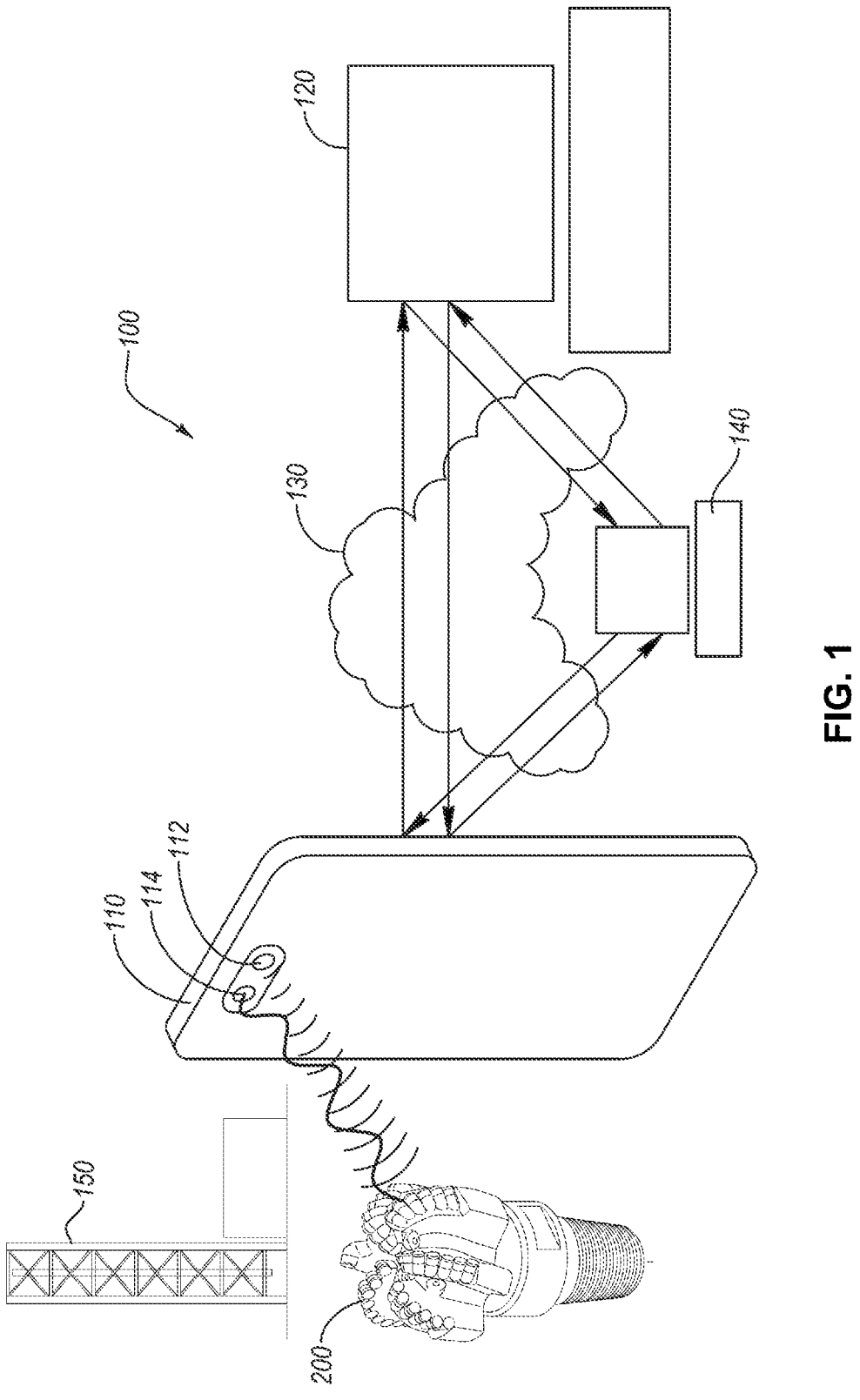
FIG. 1 is a schematic of a system for evaluating the condition of a drill bit, according to an embodiment.

FIG. 1 is a schematic of a system 100 for evaluating the condition of a drill bit, according to an embodiment. In one embodiment, the system 100 includes a an electronic device 110 (e.g., a cellular phone, a tablet, a computer or the like), a computing device 120, and a client computer 140, all operably coupled by a network 130. The electronic device 110 captures images of a drill bit 200 on-site at a drill site 150 and may communicate the images to the computing device 120 (e.g., time-of-flight or Lidar images, color images, color images taken with a flash or a combination thereof) via the network 130. The computing device 120 may include programming stored thereon to process the images to build a digital model of the drill bit 200 (which may include digital models of the cutters thereon) from the data in the images. The computing device 120 may further include programming stored thereon to determine wear or damage exhibited by one or more portions of the drill bit 200, predict a remaining useful life of one or more portions of the drill bit, and communicate any of the determined or predicted information back to the electronic device 110.

As previously noted, the electronic device 110, may include a cellular device (e.g., a phone or a tablet) configured for communication over radio waves of networked cells or areas. However, in other embodiments, the electronic device 110 need not be configured for configuration over radio waves of a networked cell and may communicate by other means, or it may be a self-contained computing device (e.g., the electronic device 110 may be integrated with, or effectively take the place of the computing device 120). The electronic device 110 may include one or more computer processors, memory and/or imaging devices such as described herein. The electronic device 110 may include a camera 112. The electronic device 110 may include a network connection such as a cellular antenna, a Wi-Fi antenna, a Bluetooth antenna, or the like for connecting to a wireless network. In other embodiments, the electronic device 110 may include input/output connections for wired connection to other electronic, cellular, or computing devices. In some embodiments, the electronic device 110 can use these features to communicate data, including image data corresponding to one or more images of the drill bit 200, over the network 130.

The electronic device 110 may include the camera 112, a flash, and a ranging image device 114 (e.g., a time-of-flight camera having time-of-flight sensor capability or a Lidar device including a laser light source and reflection sensor). The camera 112 and the ranging image device 114 may be the same or distinct from each other. When the camera 112 and the ranging image device 114 are distinct, the camera 112 has a known spatial relationship to the ranging image device 114. The camera 112 may include a digital color camera that operates with and without the flash. The camera 112 may be configured to capture one or more digital color images containing color data. In an embodiment, the camera 112 may be a high resolution color camera exhibiting a maximum resolution of about 5 megapixels ("MP") or greater, about 10 MP or greater, about 15 MP or greater, about 20 MP or greater, about 25 MP or greater, about 30 MP or greater, about 40 MP or greater, about 50 MP or greater, about 60 MP or greater, about 75 MP or greater, about 100 MP or greater, about 125 MP or greater, or in ranges of about 5 MP to about 15 MP, about 10 MP to about 20 MP, about 15 MP to about 25 MP, about 20 MP to about 30 MP, about 25 MP to about 40 MP, about 30 MP to about 50 MP, about 40 MP to about 60 MP, about 50 MP to about 75 MP, about 60 MP to about 100 MP, or about 75 MP to about 125 MP. It is noted that increasing the resolution of the camera 112 allows at least one of smaller details (e.g., cracks) to be detected during analysis, more accurate dull grading analysis, or the camera 112 to be positioned further away from the tool to be analyzed (e.g., drill bit). It is noted that the one or more color images generated by the camera 112 may be compressed.

As previously noted, the ranging image device 114 of the electronic device 110 may include a time-of-flight camera (or a Lidar apparatus or other device) having a time-of-flight sensor therein. In some embodiments, the ranging image device 114 may capture an image with depth (e.g., distance or spatial) information for each pixel within the captured image. For example, the ranging image device 114 may emit modulated light (e.g., infrared or laser light) and receive the reflected modulated or phase delayed light at a calibrated image sensor (e.g., time-of-flight sensor). Based on the time difference of the light, determined from the modulation or phase delay of the reflected light received at the image sensor, the distance of the camera or device from specific portions of features of the drill bit is determined by the ranging image device 114. The depth information of the ranging or time-of-flight images may be stored as depth data. Such time-of-flight images with their depth data may help differentiate between background objects in the images, despite varying light conditions, and may provide depth data for objects of interest in the images. For example, background objects in the color images may be the same or similar colors as one or more portions of the drill bit and may interfere with analysis of the color images. The corresponding depth data may aid an image processing program to differentiate between the objects and may provide a more accurate representation of the relative position of the surfaces of the drill tool in an image than color images alone.

The electronic device 110 may capture color images with and/or without a flash as well as the time-of-flight images contemporaneously (e.g., simultaneously or sequentially). The electronic device 110 may capture time-of-flight images and color images substantially simultaneously, such as to correlate the depth data for each pixel in a respective time-of-flight image to each pixel in the corresponding color image. For example, a single push of a button on the electronic device 110 may capture a time-of-flight or ranging image and a color image of a drill bit, wherein time-of-flight data is associated with a corresponding pixel (or pixels) of the plurality of pixels in the color image. Accordingly, the color image may include depth data for each of the pixels therein. In some examples, the time-of-flight image(s) may be obtained and stored as a separate image from the color image(s). The number of pixels of digital images may match the number of pixels of time-of-flight images. In some examples, the number of pixels of the digital images may be greater than the number of pixels of the time-of-flight images. In some examples, the electronic device 110 is programmed to capture two sequential fast mode images at each image position with respect to the drill bit 200, one image with a flash and one image without a flash. Each image of the fast mode images may include a corresponding time-of-flight image.

In an embodiment, the time-of-flight data may be used to focus the camera 112. For example, the ranging imaging device 114 may be used to determine a distance from the electronic device 110 to the drill bit or, more particular, the distance from the electronic device 110 to a selected portion of the drill bit to be imaged. The camera 112 may then be focused on the selected portion of the drill bit prior to capturing an image of the selected portion of the drill bit. Focusing the camera 112 on the selected portions of the drill bit may facilitate distinguishing elements that are in the foreground or background of image since the foreground or background elements are out of focus. Distinguishing the selected portion of the drill bit from the elements in the foreground or background may facilitate analysis of the images.

While shown as a cellular phone, the electronic device 110 or other electronic device may be mounted on a drone, a robotic arm, a framework, or other structure, mechanism or system to capture images of the drill bit 200.

The images (e.g., time-of-flight images and color images with and/or without flash) may be captured at the site where the drill bit is being employed, such as at a drill rig or yard, and communicated to the computing device 120 via the network 130 as image data corresponding to each respective image. The image data may include color data and depth data for the plurality of pixels of each image, either individually or collectively for each position (with respect to the drill bit) in which the image was captured. Time-of-flight images can provide resolution in at least the micron scale, such as 1 μm to 100 μm. Accordingly, cracks, wear, spalling, and other signs of wear may be accurately observed via the time-of-flight images captured by the electronic device 110. Also, the color data of the color images may have resolution in the micron range, thereby providing additional resolution to the three-dimensional digital model.

The electronic device 110 may also include one or more orientation sensors, such as inertial sensors (e.g., one or more of accelerometers or gyroscopes), magnetometer, GPS receiver, magnetic compass, or the like to provide orientation information related to the images, such as the orientation of the electronic device 110 (e.g., cellular device) and/or orientation of the camera(s) (e.g., the ranging imaging device 114 and/or high-resolution color camera 112) corresponding to each image. Such information may provide spatial information for determining the position of an image with respect to other images. Such orientation information may be included in the corresponding image data. As will be discussed in more detail below, the orientation of the electronic device 110, as detected by the orientation sensors, may facilitate creation of the three-dimensional model. For example, the orientation sensors may indicate the position of the electronic device 110 relative to a fixed location (e.g., magnetic north) or may indicate when the electronic device 110 moves from imaging one region to another region of the drill bit (e.g., imaging one blade to another blade or one cutter to another cutter).

The computing device 120 includes operational programs (e.g., machine readable and executable instructions) stored therein to build and analyze a digital model of the drill bit 200 based on the image data corresponding to the images. For example, the computing device 120 may include an image processor (e.g., image processing module) having instructions to build and analyze the digital model of the drill bit. The instructions may include instructions to build a three-dimensional digital model of the drill bit from the images. For example, the image processing module may include instructions to fit (e.g., assemble) a plurality of images into a three-dimensional digital model of the drill bit. The time-of-flight data from the time-of-flight images may be used to determine three-dimensional characteristics of each of image of the plurality of images of the drill bit based on the distance data therein. Color image data from the digital images may additionally or alternatively be used to determine three-dimensional characteristics of each of image of the plurality of images of the drill bit based on the colors therein. The instructions may include instructions to fit (e.g., overlay, overlap, "stitch" and/or otherwise piece together) like geometric features from the different images. The orientation information may be utilized to fit the images together to form the digital model.

In some examples, separate digital models for the time-of-flight data and color data may be built and combined to provide the three-dimensional digital model, by the image processing module. Inconsistencies therebetween may be reconciled by the image processor, for example, by favoring one model over the other or using an average of the various models.

The image processing module may include an analysis (sub) module to analyze the three-dimensional digital model. The instructions of the analysis module may include instructions to extrapolate, from the three-dimensional digital model, the current condition of the drill bit, including each of the components thereon. For example, at least some (and in some embodiments, each) of the cutters present on the drill bit 200 may be modeled and digitally compared to a model of a new cutter to determine an amount of wear, an amount of spalling, presence of cracks, size of cracks, or the like. By comparing the models of the used cutters to new cutters, the approximate useful life of the drill bit and/or individual cutters thereon may be determined, such as via the analysis module. As discussed in more detail below, by observing the condition of the drill bit and associated cutters, the operational program(s) may provide feedback to the user, such as an expected life of the cutter, a recommendation for cutter compositions (e.g., different polycrystalline diamond compositions of a PDC), shapes, sizes, styles, configurations or the like based on the condition of the cutters and the composition of the rock in the drill hole or the area where the drilling is indicated to take place.

The computing device 120 may include one or more artificial learning modules, such as one or more machine learning modules or one or more deep learning algorithms (e.g., a modified SSD-MobileNet V2 module and/or modified Deep Lab V3 that are modified to use time-of-flight data in addition to color images). The machine learning modules to teach the computing device 120 or machine readable and executable instructions therein to recognize and correlate signs of damage (e.g., wear, spalling, cracks, etc.) with drilling data, such as an indicated running time of the drill bit, in order to better predict a remaining life of the drill bit or portions thereof. Additionally, the machine learning modules may teach the computing device 120 which types of cutters might be best suited for a particularly situation (e.g., which diamond compositions or PDC formation processes create cutters that wear the best in conditions similar to those of the drill site). The machine learning module may communicate with or teach the analysis module to reach specific determinations as disclosed herein.

Upon analyzing the digital model of the drill bit, or one or more portions thereof, the computing device 120 may output an indication of the expected remaining life of the drill bit or portions thereof (e.g., cutters) back to a requestor of a determination at the drill site. For example, the computing device may include instructions to automatically output a diagnostic analysis or outcomes (e.g., recommendations) thereof back to the requestor via the electronic device 110 or the client computer 140 of the requestor via the network 130 based on the three-dimensional digital model built from the image data of the color images and time-of-flight or ranging images captured by the requestor. The requestor may include, for example, one or more drillers, engineers, project managers, or the like.

The computing device 120 may be operably coupled (e.g., wirelessly connected) to the electronic device 110 and the client computer 140 via the network 130. The analysis or outcomes (e.g., recommendations) thereof may be communicated to the client computer 140 or electronic device 110. Accordingly, the analysis or outcomes thereof may be sent to the drill site 150 and stored off-site, such as at the source of analysis (e.g., computing device 120 and/or the client computer 140). In an indirect communication, the client computer 140 may receive and communicate the digital models, the analysis, or outcomes to the electronic device 110. For example, a driller may send the plurality of images directly to the computing device 120 or to the client computer 140, which may then relay the plurality of images to the computing device 120. The computing device 120 may communicate the analysis or output to the client computer 140 of the driller at a field office or headquarters. The driller may then send the analysis or outcome to the electronic device 110 at the drill site 150.

The computing device 120 may include a network connection (e.g., Wi-Fi antenna, Bluetooth antenna, LAN connection) to communicate with the network 130. The network 130 is operably coupled to the electronic device 110. For example, the electronic device 110 may include a network connection to communicate with the network 130. Accordingly, the computing device 120 may include a network connection configured to communicate with one or more cellular devices.

The network 130 may include one or more of a cellular network (e.g., 4G or 5G network), a LAN, a Wi-Fi network, a cloud based storage network, one or more servers, or the like. The network 130 may be configured to communicate with cellular devices, computing devices, client computers, or any other computing device operably coupled thereto. Data, such as images or analyses results, may be transferred across the network 130 from the electronic device 110 to the computing device 120 or vice versa to provide analyses of drill bits in the field.

Figure 2:
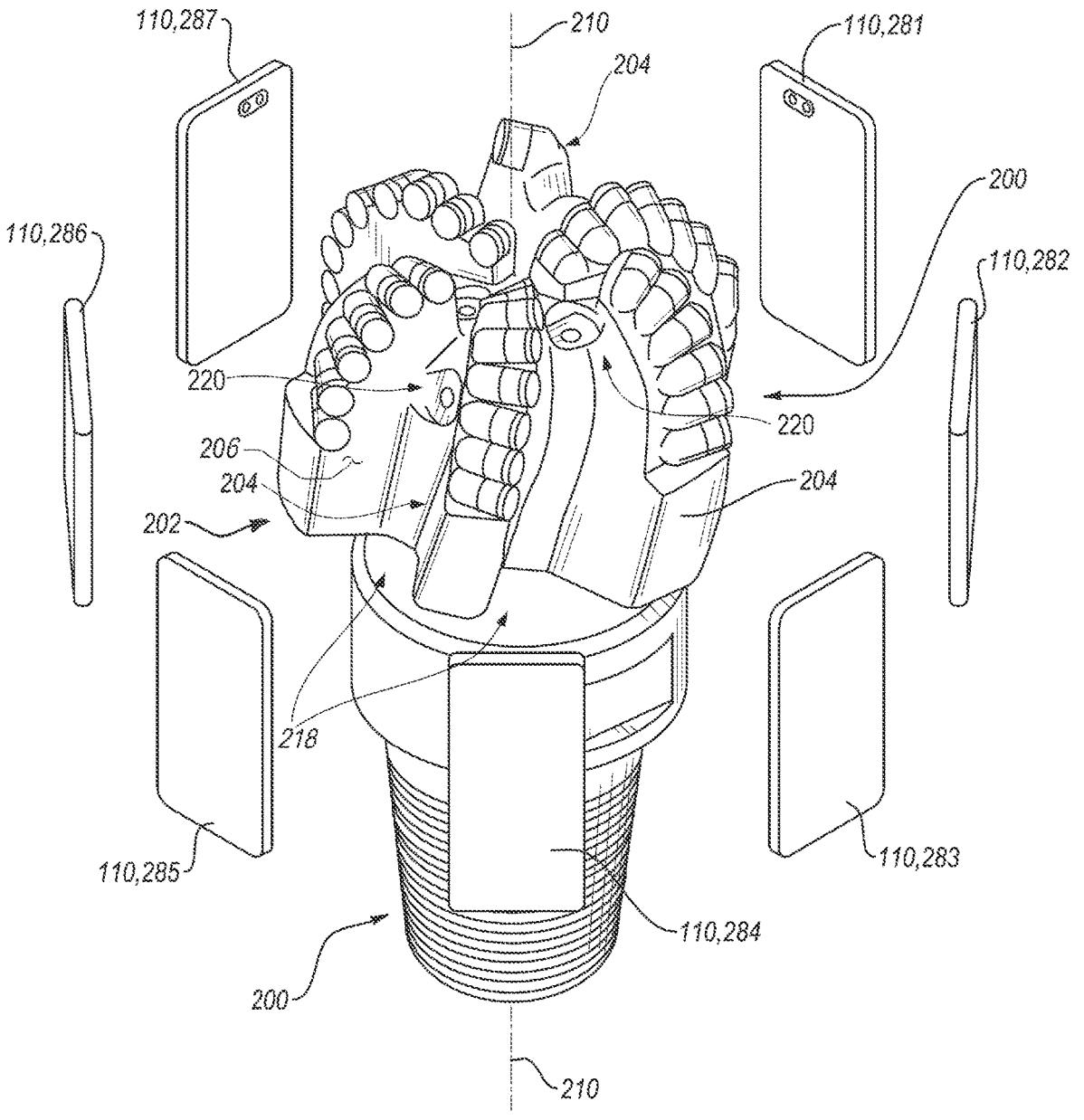
FIG. 2 is an isometric view of a rotary drill bit, according to an embodiment.
Figure 3:
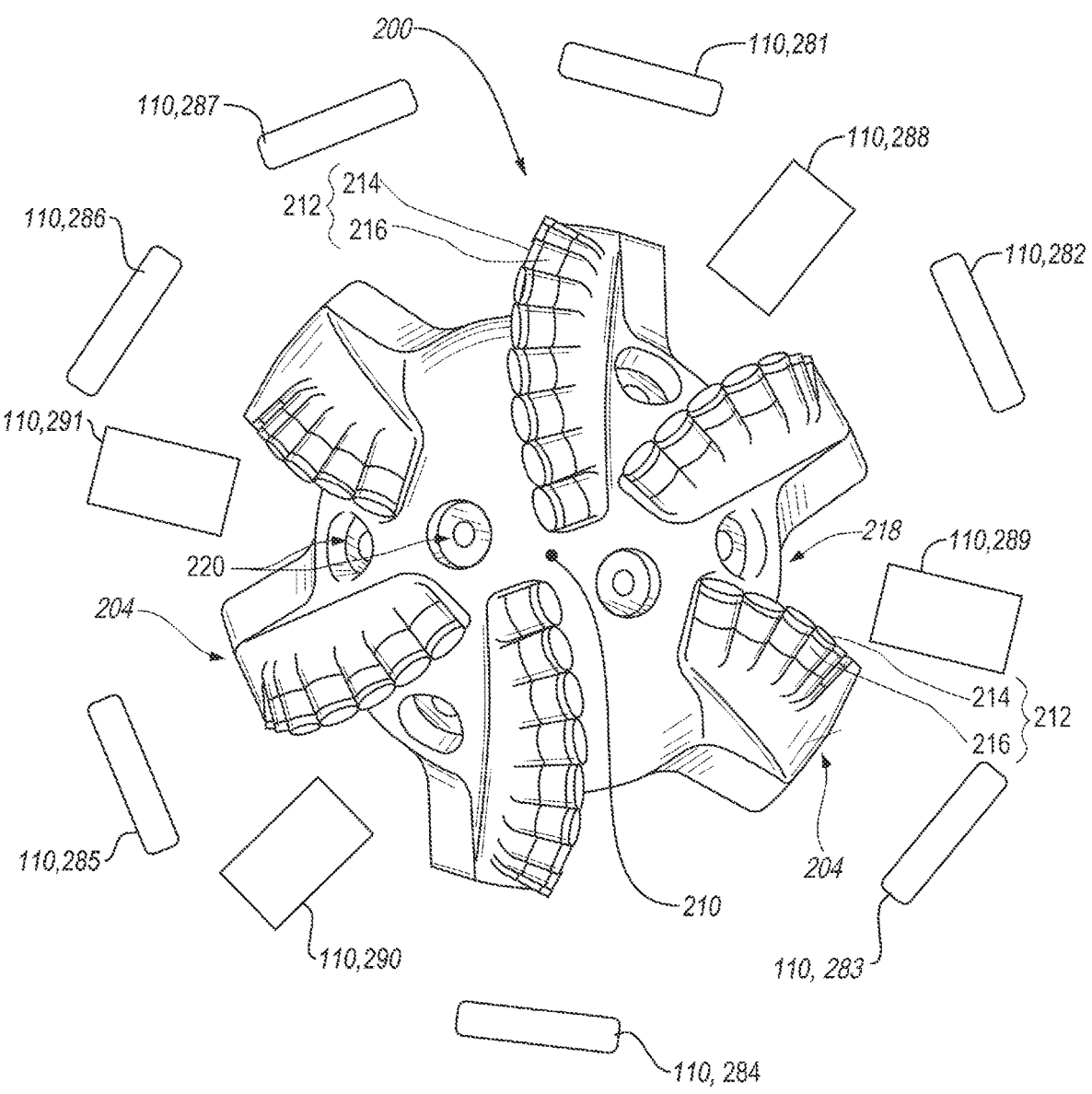
FIG. 3 is a top elevation view of the rotary drill bit of FIG. 2, according to an embodiment.

Drill bits may be imaged from a number of different angles to form a digital model by fitting the plurality of color and time-of-flight images together in the computing device. FIG. 2 is an isometric view and FIG. 3 is a top elevation view of an embodiment of a rotary drill bit 200. The rotary drill bit 200 includes a plurality of cutters (e.g., polycrystalline diamond compacts ("PDCs"), cubic boron nitride compacts, etc.). The bit body 202 defines a leading end structure for drilling into a subterranean formation by rotation about a longitudinal axis 210 (e.g., rotational axis or central axis) and application of weight-on-bit. The rotary drill bit 200 comprises a bit body 202 that includes radially and longitudinally extending blades 204 with leading faces 206, and a threaded pin connection 208 for connecting the bit body 202 to a drilling string. The blades 204 may include at least one of one or more primary blades, one or more secondary blades, or one or more additional (e.g., ternary) blades. The primary blades extends radially from a portion of the bit body 202 that is closer to a longitudinal axis 210 than the secondary blades. Also, circumferentially adjacent blades 204 define so-called junk slots 218 therebetween. Additionally, the rotary drill bit 200 may include a plurality of nozzle cavities 220 for communicating drilling fluid from the interior of the rotary drill bit 200 to the PDCs 212 and other external portions of the drill bit 200. The nozzle cavities 220 may include one or more nozzles disposed therein.

At least one cutter may be attached to the drill bit. For example, at least one PDC cutting element may be affixed to the bit body 202. With reference to FIG. 2, a plurality of PDCs 212 are secured to the blades 204. For example, each PDC 212 may include a PCD table 214 bonded to a substrate 216. Generally, PCD tables 214 include a body of sintered polycrystalline diamond and substrates 216 include a refractory metal carbide, such as tungsten carbide. Some suitable but non-limiting examples, of PDCs, PCD tables, substrates, and methods of making the same are disclosed in U.S. Pat. Nos. 7,866,418; 7,998,573; 8,034,136; and 8,236,074; the disclosures of each of the foregoing patents are incorporated herein, in their entireties, by this reference.

FIGS. 2 and 3 depict one embodiment of a rotary drill bit 200 that employs at least one cutting element. The rotary drill bit 200 is used to represent any number of earth-boring tools or drilling tools, including, for example, core bits, roller-cone bits, fixed-cutter bits, eccentric bits, bicenter bits, reamers, reamer wings, or any other downhole tool including PDCs, without limitation.

Images of the drill bit may be captured from a plurality of angles. For example, the electronic device 110 may capture images from perspective points or locations 281-291. The perspective points 281-287 may be radially distributed around the longitudinal axis 210, such as to capture images of the sides of the drill bit 200. The perspective points 288-291 may be taken from above the drill bit 200 to provide top view images of the drill bit 200 (e.g., images of the face and/or crown of the drill bit 200). The plurality of angles may provide information to build the digital model of drill bit. For example, the digital and time-of-flight images corresponding to at least some of the views from the plurality of perspective points 281-291 may be used to form the digital model of the drill bit 200. It is noted that perspective points may be achieved by moving the electronic device 110 relative to the rotary drill bit 200, by moving the rotary drill bit 200 relative to the electronic device 110, or by moving both the electronic device 110 and the rotary drill bit 200 relative to each other.

The plurality of images captured from the various perspective points may provide resolution sufficient to visualize the conditions of cutting elements present on the drill bit 200. The plurality of images may be communicated to the computing device 120 for analysis thereon.

The computing device 120 may include operational programs stored thereon to receive the plurality of images, build a digital model of the drill bit, analyze a digital model of the drill bit, recommend a course of action for the driller with respect to the drill bit, indicate a projected life of the drill bit or portions thereof, determine a cutter composition suitable for the drill conditions, etc., all based on the image data corresponding to the images. For example, an image processing module may include machine readable and executable instructions to receive images, built a digital model, and analyze the digital model.

The computing device 120 may receive the plurality of images in any digital format such as TIFF, JPEG, GIV, PNG, BMP, or the like. The images may be presented and received in two dimensional or three-dimensional vector formats, such as CGM, SVG, STL, OBJ, STEP, or the like. For example, color images may be presented and received as two dimensional images while the time-of-flight images may be presented and received as detailed three-dimensional depth maps, wherein the time-of-flight data may indicate a depth or distance from the camera for each pixel therein.

The computing device 120 includes image processing module having machine readable and executable instructions to fit the plurality of images together to build a model of the drill bit. The instructions may include instructions to identify and relate structures in the plurality of images, such as based on geometric data in the time-of-flight images as well as color changes and contrasts in the color images. The images may include depth data for each pixel in the time-of-flight images and match the pixels therein to pixels from the color images to build or develop a geometric structure representative of the object(s) captured by the images.

The instructions may include machine readable and executable instructions to match, overlap, overlay, or otherwise fit matching patterns of pixels from separate images with each other to generate a model of the drill bit. For example, each image of the plurality of images may only capture a portion of the drill bit and the operational instructions may instruct the processor to align matching portions from two images or models thereof with each other to form a combination image or model from the two images. The machine readable instructions include instructions for fitting pixels of one or more structures in a first image with pixels of the one or more structures from at least a second image to form the three-dimensional model of the drill bit. The instructions may direct the processor to iteratively perform this function with each image until a digital model is completed using all (or at least some) of the plurality of images. The instructions may direct the processor to fit pixels of one or more structures in a first image with pixels of the one or more structures from at least a second image to form the three-dimensional model of the drill bit.

The machine readable and executable instructions for generating the digital model of the drill bit may include instructions for combining image data from the plurality of images to form a three-dimensional model of the drill bit utilizing depth data provided by the time-of-flight images. For example, the instruction may include instructions to infer depth (or other geometric relationships) to selected portions of the images and infer the depth to the resulting model to build a three-dimensional digital model of the drill bit from the plurality of images. In such examples, each image may include depth data from the time-of-flight camera to provide a geometric relationship between the objects therein. Each image of the plurality of images may be built (according to the instructions) as a partial three-dimensional model and at least some of the partial three-dimensional models may be assembled by a computing device by identifying and overlaying identical geometric objects therein to form the (collective) three-dimensional model. The machine readable instructions include instructions for building a partial three-dimensional model for each image and combining the partial three-dimensional models. For example, the three-dimensional digital model built by the image processor by combining all of the partial three-dimensional models.

The machine readable and executable instructions for generating the digital model of the drill bit may include instructions for transforming the position of each component in the images from a camera or image coordinate system to a single coordinate system of the three-dimensional geometric model. For example, the machine readable and executable instructions for generating the digital model of the drill bit may include instructions for correlating each portion on the digital model to a center longitudinal axis (e.g., pin center) of the drill bit of the digital model. The relationship between the longitudinal axis and the damage states of the cutters (e.g., wear flats) may provide information to determine or predict forces on the drill bit, life of the drill bit (or cutters), or the like. The single coordinate system of the three-dimensional geometric model may include a Cartesian coordinate system, a polar coordinate system, or another coordinate system. In an example, the coordinate system of at least a portion of the three-dimensional geometric model may be a polar coordinate system which may allow the image processor to efficiently recognize, track, discriminate, and measure the blades, nozzle cavities, and nozzles when using a top view of the drill bit.

The machine readable and executable instructions for generating the digital model of the drill bit may include instructions for differentiating between the materials on the drill bit or components thereof. For example, the images may include sequential fast mode (color) images of the drill bit at one or more positions relative thereto-one with flash and one with no flash. The fast mode images may be provided to an artificial intelligence processor in the computing device to differentiate between materials on the drill bit, such as between diamond and tungsten carbide by observing fluorescent properties of the various materials. Likewise, the time-of-flight camera may be used to differentiate between some materials on the drill bit. For example, the time-of-flight light emitter (e.g., laser) may illuminate the materials of the drill bit, which may have observable differences therebetween. In an embodiment, the machine readable and executable instructions for generating the digital model may include differentiating between the materials on the drill bit and determining a probability score that the materials were correctly differentiated. For example, the instructions may be configured to detect one or more PDCs, such as one or more PDC cutters. The machine readable and executable instruction instructions may assign a probability score to each of the detected PDC cutters indicating whether the detected PDC cutters were correctly or erroneously detected as PDC cutters. The machine readable and executable instructions may include a threshold value and the machine readable and executable instruction instructions may only accept the detected PDC cutters as being PDC when the probability score is above the threshold value. The machine readable and executable instruction instructions may also include instructions to provide the probability score to electronic device 110, the client computer 140, or other provide the probability score to user, such as provide the probability score in a report.

The machine readable and executable instructions for generating the digital model of the drill bit may include instructions to change the brightness of one or more regions the color image. For example, the instructions may include using historical and/or normalized images of a drill bit to determine portions of the color images that are too dark or bright. The instructions may include brightening and darkening such dark and bright portions, respectively, of the color image to better match the historical and/or normalized images. Brightening and darkening such dark and bright portions, respectively, of the color image may facilitate evaluating the three-dimensional model generated from the color images since, such dark and bright portions of the color images may be difficult to evaluate.

The machine readable and executable instructions for generating the digital model of the drill bit may include instructions to enhance the color images. In an example, enhancing the color images may include changing the brightness of one or more regions of the color images, as previously discussed. In an example, enhancing the color images includes image straightening a color image that appears skewed either due to the electronic device being inclined to the drill bit or a cutter when taking the image or due to a back or side rake angle that makes a surface of the cutter appear as an elliptical face. The image straightening may correct for such inclination and may facilitate more accurate dull grading. In an example, enhancing the color image may include using a combination of zoomed close by depth images, high resolution images, depth calibrated images, and historical and/or normalized images to produce an enhanced image.

In some examples, the three-dimensional model may include "gaps" where no image data is available. In such examples, the model may include the gap as a blank space, when the rest of the model is completed. Accordingly, a plurality of images may be fit together to form an at least a partial model of the drill bit. The three-dimensional digital model may be stored in the computing device 120 for later use, such as in a three-dimensional model format (e.g., STL, OBJ, 3DS, IGES, STEP, or the like). The digital model may be built in a first file format and converted to a second, three-dimensional model file format.

The computing device 120 includes machine readable and executable instructions to analyze (e.g., evaluate) the digital model of the drill bit according to one or more criteria. For example, the digital model generated from the plurality of images may be evaluated by an analysis module (e.g., submodule of the image processing module) to identify structure(s) of the drill bit. Such structure(s) may be identified as longitudinally extending blades (e.g., primary blades, secondary blades, etc.), leading faces thereof, the plurality of cutters (e.g., PDCs) thereon, junk slots, nozzle cavities, nozzles disposed in the nozzle cavities, or any other portion of the drill bits disclosed herein. The instructions may include identifying the longitudinal axis (e.g., center of the face) of the drill bit. In an example, the structures of the drill bit may be identified using the longitudinal axis. For example, the blades may be identified as primary or secondary blades based on the distance between the blades and the longitudinal axis.

The instructions may include machine readable and executable instructions to identify the longitudinally extending blades of the drill bit. Identifying the blades may include determining a quantity of blades on the drill bit. Identifying the blades may be determines based on the geometric, other visible information associated with the blades, or the orientation of the ranging imaging device or the color camera. In an example, damage to the blades or to the one or more cutters attached to the blades may be unique, thereby allowing the computing device 120 to recognize the one or more unique attributes of each blades in the three-dimensional model. In an example, the identification of the blades may include determining the geometry or surface features (e.g., any writing thereof) of each blade or the cutters attached to the blades. In such an example, the geometry or surface features that may be tracked includes identifying the one or more blades as a primary or secondary blade (e.g., based on a proximity of the blades to the longitudinal axis of the drill bit), determining a diameter of the blades, etc. In an example, the computing device 120 may use the orientation of the electronic device 110, as detected using one or more orientation sensors, to identify the blades. For instance, the orientation sensors may include a magnetic compass or global positioning sensor that may indicate the direction that the electronic device 110 is facing relative to a fixed point (e.g., magnetic north) when the time-of-flight data and the color images where created. The computing device 120 may use the direction that the electronic device 110 is facing relative to a fixed point to identify the blades and determine an orientation of the blades relative to the fixed point. In an embodiment, after identifying the blades, the computer device 120 may assign an identification number to each of the identified blades, otherwise label, or otherwise allow the identify of each of the detected blades to be tracked.

In an embodiment, the machine readable and executable instructions may include instructions for distinguishing between a first blade (e.g., a blade being imaged) and a second blade that is in the background or foreground relative to the first blade. For example, the first blade and the second blade may be difficult to distinguish from each other using the color images since first and second blades exhibit similar colors and may blend together. The difficultly in distinguishing the first and second blades from each other may also make it difficult to determine whether cutters in the image belong to the first or second blade. As such, the instructions may include using the time-of-flight data to distinguish between the first and second blades. The instruction may include determining a first distance from the ranging imaging device 114 to the first blade and a second distance from the ranging imaging device 114 to the second blade. The instructions may include excluding the second blade from any analysis or may be used to distinguish between the first and second blades based on the second distance being different than the first distance. Being able to distinguish between the first and second blades may also allow the detected cutters to be matched to the first or second blade based on the second distance being different than the first distance.

The instructions may include one or more threshold values that are used to identify and distinguish the different structure of the drill bit. For example, the drill bit may include a first component (e.g., a blade) and a second component (e.g., junk slot). The first components may be spaced from the ranging imaging device 114 by a first distance and the second component may be spaced from the ranging imaging device 114 may a second distance, wherein a gradient distance is the difference between the first distance and the second distance. The threshold value may include a value or range of values. When the gradient distance is equal to the threshold value or within the range of values, the identity of the first and second components may be assumes based on the threshold value. It is noted that the first component and the second component may be spaced from each other by a circumferential distance relative to a longitudinal axis of the drill bit. The threshold value may require that the first and second component be within a certain range of values in addition to the gradient distance being within the threshold value.

The instructions may include machine readable and executable instructions to identify one or more cutters (e.g., each cutter) of the plurality of cutters on the digital model of the drill bit. Identifying the one or more cutters may include quantifying the number of cutters. Each cutter may be individually identified as a distinct cutter for later evaluation against a template or standard of a cutter, such as a digital model of an unused version of the cutter. Each cutter may be identified based on the geometric or other visible information associated with the cutter. For example, the damage to each cutter may be unique, thereby enabling the computing device 120 to recognize one or more unique attributes of each cutter in the three-dimensional model. In such examples, the identification of the cutters may include determining the geometry or surface features (e.g., any writing thereon) of each cutter. At least some of the cutters, the longitudinally extending blades, or the cutter slots positioned on the blades for receiving the cutters may be labeled with writing or engraving to identify the respective components, which may be visible or otherwise discernable in the three-dimensional model. In some examples, each component of specific type of drill bit may be automatically numbered according to a selected numbering convention (e.g., clockwise from a first position) and each cutter therein may be identified by a number in the numbering convention.

The instructions for identifying at least some of the cutters (e.g., each cutter) of the plurality of cutters may include instructions to label each identified cutter with an identification number to correlate characteristics of the cutter thereto. Accordingly, the determined condition of each cutter may be attributed to the identified cutter in the digital model via the label corresponding thereto.

In an example, the instructions for identifying at least some of the cutters of the plurality of cutters may include determining a position of the cutters relative to a longitudinal axis of the drill bit, such as determining a radial distance from at least some of the cutters to the longitudinal axis. In an example, the instructions for identifying at least some of the cutters of the plurality of cutters may include identifying which of the blades the cutter(s) is attached to and/or the relative position of the cutter(s) on the blade.

In an embodiment, new time-of-flight data and color images may be obtained after obtaining the original time-of-flight data and color images that were used to identify the blades and/or the cutters of the drill bit. The new time-of-flight data and color images may be obtained for a variety of reasons, such as to fill in gaps in the three-dimensional model. The machine readable and executable instructions may include instructions to identify the blades and/or cutters contained in the new time-of-flight data and color images and match the identified blades and/or cutters of the new time-of-flight data and color images with the blades and/or cutters of the three-dimensional model (e.g., the blades and/or cutters contained in the original time-of-flight data and color images.) For examples, the instruction may include at least one of matching the geometry of the blades and/or cutters of the new and original time-of-flight data and color images; other visible information (e.g., damage, surface features, etc.) of the blades and/or cutters of the new and original time-of-flight data and color images, the orientation of the electronic device, position of the blades and/or cutters on the drill bit (e.g., distance from the longitudinal axis), or any of the other identifying techniques disclosed herein. In an example, the instructions may include determining whether the drill bit was moved between obtaining the original time-of-flight data and color images and obtaining the new time-of-flight data and color images. If it is determined that the drill bit was moved, the instructions may include aligning at least one of the new time-of-flight data or the new color images with the three-dimensional model. It is noted that, at least initially, the orientation of the electronic device may not be used to align the new time-of-flight data or the new color images with the three-dimensional model since the orientation of the drill bit may have changed. However, once one of the new time-of-flight or color images is aligned with the three-dimensional model, how the drill bit moved may be determined which then allows the orientation of the electronic device to be use to align the remainder of the new time-of-flight data and color images on the three-dimensional model.

The machine readable and executable instructions to evaluate the digital model includes instructions to determine a condition of at least one cutter of the plurality of cutters. The instructions include instructions to measure the dimensions of the cutter. For example, the thickness and diameter of one or more portions of a cutter may be measured (e.g., ascertained from the dimensions of the model) to the determine the current condition of the cutter. In such examples, the polycrystalline diamond (PCD) table of a PDC may be measured and differentiated from the substrate attached thereto, in order to determine the amount of wear on the PCD table. For example, the PCD table can be measured to determine an amount of wear thereon (e.g., missing material), such as at a surface at the leading edge of rotation which engages the drilling substrate.

The machine readable and executable instructions for evaluating the digital model include instructions for determining if one or more of spalling, wear, cracking, side cracking, delamination, breakage, or corrosion are present in the digital model. For example, the instructions in the analysis module may include instructions to measure signs of wear, spalling, cracking, delamination, breakage, corrosion, change of shape, or other damage present on the cutter, such as on one or both of the PCD table or the substrate of a given PDC. In an embodiment, the machine readable and executable instructions include a plurality or machine learning modules that are each configured to perform different analyses to the cutters. In an example, the plurality machine learning modules may include at least one machine learning identifying module configured to identifying the cutters and at least one machine learning failure module configured to detect one or more failure modes (e.g., spalling, delamination, cracking, etc.) or wear on a given cutter. The at least one machine learning failure module may include a single machine learning failure module that detect the wear and failure mode of the cutter or a plurality of machine learning failure modules that are configured to detect wear on the cutters and/or one or more of the failure modes of the cutter. It is noted that these machine learning modules may be replaced with other types of artificial intelligence modules.

Figure 4:
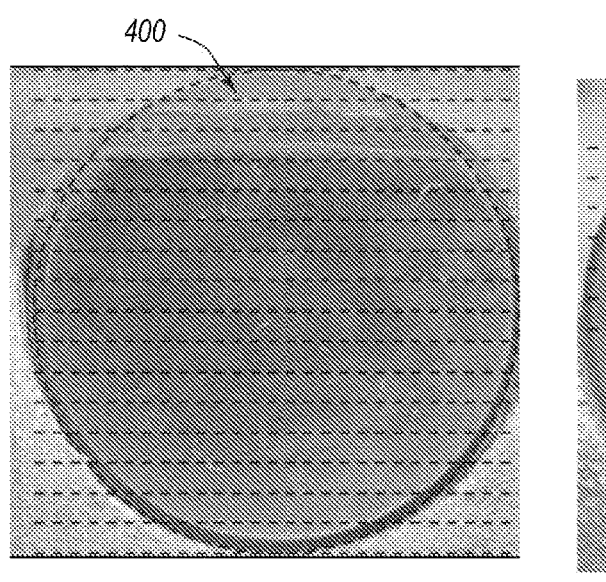

FIGS. 4-11 are photos of various failure modes of PDC cutters. FIG. 4 depicts wear of a cutter 400. Wear occurs as portions of the cutter (e.g., PCD table or substrate) erode as they engage a drilling substrate such as rock formation. As shown, the wear can be measured to provide a quantitative value of the wear. Wear percentage of the PDC cutter can be measured as the difference in the outer dimensions or volume of the PCD table from the modeled cutter compared to an identical but unused cutter (model). For example, the distance from the outermost portion of the modeled PCD table (which can be inferred from a model of an undamaged substrate or an unused cutter) to the outermost portions of the modeled cutter may provide a measurement of distance, area, or volume of wear. Wear can be quantified as an area or volume of missing material on the cutter 400. For example, wear can be measured as a combination of depth, width, and/or length of material missing from the PCD table and/or substrate. In an embodiment, the instructions for determining the wear percentage of the PCD table may include analyzing the PCD table to find an unworn or substantially unworn portion of the PCD table. The original radius of the PCD table may be inferred from the radius of the unworn or substantially unworn portion of the PCD table. A circle corresponding to the original radius of the unworn or substantially unworn portion of the PCD table may be drawn over the PCD table. The circle may correspond to the original shape of the PCD table. The variation between the worn PCD table and the circle may indicate the wear percentage of the PCD table. It is noted that the time-of-flight data may be useful in determining the placement of the circle and the deviation of the worn portions of the PCD table from the circle.

Figure 5:
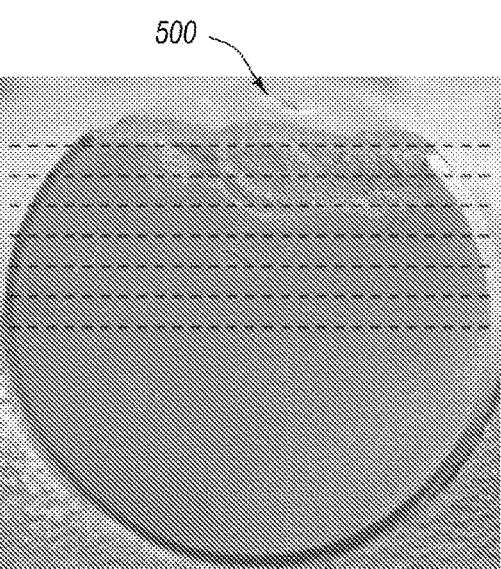

FIG. 5 depicts spalling of a cutter 500. Spalling occurs as shallow portions of the cutting face (e.g., PCD table) break away from the cutter. Spalling may occur as material loss generally parallel to the cutter face. Spalling may appear or occur as flake loss of one or more portions of the cutter and may be visible by tell-tale "steps" in the cutter face. These "steps" also help the computing device differentiate between spalling and wear. The steps can be measured for length, width, depth, area, or volume to determine a total amount (e.g., area or volume) of spalling. The measured amounts can be compared to geometric data for a model of an unused cutter to determine the difference therebetween.

Figure 6:
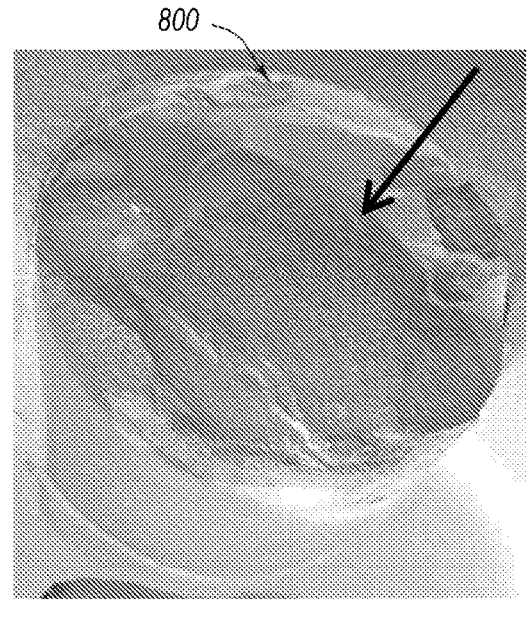

FIG. 6 depicts delamination of a cutter 600. Delamination occurs as portions of the cutting face (e.g., PCD table) break away from the cutter parallel to the face of the cutter such that the break, or a portion of the break, extends all the way to the substrate. Like spalling, delamination may occur as flake loss of one or more portions of the cutter and may be visible by tell-tale "steps" in the cutter face. The steps can be measured for length, width, depth, area, or volume to determine a total amount (e.g., area or volume) of delamination. Unlike spalling, delamination occurs when portions of the PCD table separate from the substrate. The exposed substrate may be determined (e.g., inferred) by an observed material composition difference (e.g., an observed color difference) between the PCD table and the substrate and/or by a measured dimension of an outermost surface of the modeled cutter known to be below the depth of a PCD table.

Figure 7:
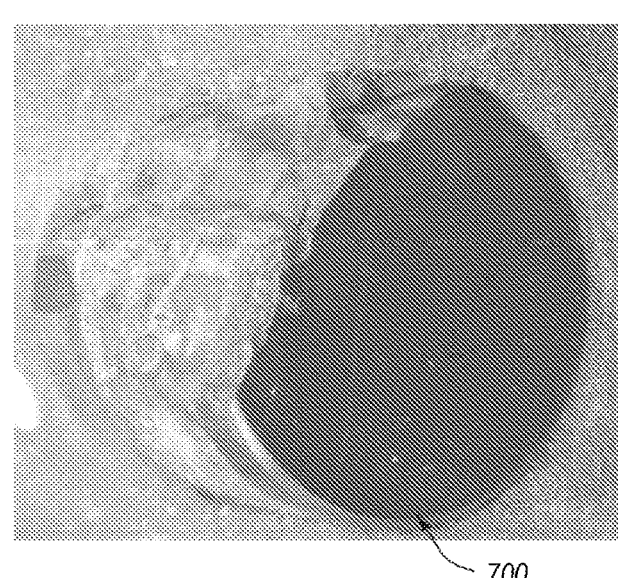

FIG. 7 depicts breakage of a cutter 700. Breakage occurs as portions of the cutting face (e.g., PCD table) break away from the cutter perpendicular to the face of the cutter all the way to and including at least some of the substrate. Breakage can be measured for length, width, depth, area, or volume to determine a total amount (e.g., area or volume) of breakage. Breakage may be determined by volume difference between the modeled cutter and a model of an unused PCD table and substrate.

FIG. 8 depicts erosion or corrosion of the substrate of a cutter 800. Erosion or corrosion occurs at the substrate as material from the softer substrate (e.g., tungsten carbide) erodes or corrodes away during use while the relatively harder PCD table remains intact. For example, certain rock formations, harsh drilling fluid compositions, or even slurries formed by the drilling fluid may cause erosion or corrosion of the substrate. Eroded or corroded areas can be measured for length, width, depth, area, or volume to determine a total amount (e.g., area or volume) of erosion on the cutter. Erosion or corrosion may be determined by volume difference between the modeled substrate and a model of an unused substrate.

FIG. 9 depicts cracks in a cutter 900. Cracks occur as portions of the cutting face (e.g., PCD table) break perpendicular to the face of the cutter but do not result in substantial volumes of material detaching or separating from the cutting face. Cracks can be measured for length. Cracks may be quantified by length such as the total length of all cracking observed on the model of the cutting face of a respective cutter. Cracks may be determined as discoloration or even small (e.g., micron scale width) discontinuities in the cutting face that travel therealong. Often, cracks originate or terminate at the outermost surface of the cutting face (e.g., lateral surface) or from other cracks therein.

FIG. 10 depicts side cracks in a cutter 1000. Side racks occurs as portions of the cutting face (e.g., PCD table) break parallel to the face of the cutter but do not separate from the cutting face. Side cracking can be measured for length. Side cracks may be quantified as the total length of all side cracking on a cutting face. Side cracks may be determined as discoloration or even small (e.g., micron scale width) discontinuities in a lateral surface of the PCD table that travel therealong. Side cracks may be present throughout the PCD table and may be visible and measured through regions of wear or breakage.

FIG. 11 depicts a demolished cutter 1100. A demolished cutter may be identified as no PCD table remaining (at least in a substantial portion of the cutter) and damage to the substrate. Demolished status can be measured for the presence, whether by color or dimension, of the PCD table and substrate. The measurements can be compared to a model of an unused substrate to infer an amount of damage. A demolished cutter indicates total failure of the cutter.

While the term "measured" is used, the instructions may include instructions to estimate the wear, spalling, delamination, breakage, cracking, etc. of the cutters according to an arbitrary measurement system, such as generic units of length, width, volume, etc. Accordingly, the "measurements" need not be on the standard or metric scale. The resolution of the images used to form the digital model may be high enough to enable the digital model to exhibit any of the damage disclosed above. For example, the color images and the time-of-flight images may provide resolution in the micron scale, such as about 50 microns or less.

The machine readable and executable instructions of the analysis module may include instructions for determining a boundary of the PDC or the PCD table. The instruction may also overlay one or more boundary boxes over the PDC or the PCD table. After overlaying the one or more boundary boxes, any analysis of the PDC or the PCD table may be restricted only to the area of the drill bit that is within boundary box. Limiting the analysis of the PDC or the PCD table only to the area of the drill bit that is within the boundary box may prevent analyzing portions of the drill bit that does not include the PDC or the PCD table which may decrease the likelihood of erroneous analyses and decrease computer resources necessary to analyze the PDC or PCD table. The time-of-flight data and the color images may facilitate the placement of the boundary boxes. For instance, a color change in the color images may indicate which portions of the drill bit is the PDC or the PCD table and the boundary boxes may indicate where the color change occurs. The time-of-flight data may confirm that the color change indicates which portions of the drill bit is the PDC or the PCD table since the PDC or the PCD table may protrude from the bit body. The time-of-flight data may also be used to determine which portions of the drill bit are the PDC or the PCD table when there is no easily distinguishable color change between the bit body and the PDC or the PCD table (e.g., due to poor lighting). It is noted that the boundary box may exhibit a generally box-like shape (e.g., a generally rectangular shape) or a non-box-like shape (e.g., a generally circular, oblong, or elliptical shape). It is noted that boundary boxes may be overlaid on other portions of the drill bit other than the cutters.

The machine readable and executable instructions of the analysis module may include instructions for comparing at least one identified cutter of the plurality of cutters to a model of an unused version of the at least one identified cutter. The identified cutter may be compared to a model of an unused or a "perfect" cutter to determine the differences therebetween. The differences may be quantified, such as by area or volume of missing material, to determine a state of the identified cutter. For example, a wear state of the identified cutter may be determined by comparing the volume of the PCD table of the identified cutter to the volume of an unused model of the cutter. The difference of volume therebetween may be inferred as the amount of damage to the identified cutter or the amount of life used for the identified cutter. Similar comparisons may be made for breakage, delamination, spalling, cracking, or the like.

The instructions to determine the condition of each cutter may include instructions to measure, calculate, and indicate if any of the damage noted herein (e.g., wear, spalling, breakage, cracking, etc.) is present on the identified cutter. The instructions to determine the condition of each cutter may include instructions to identify the amount of useful life of each cutter, such as by comparing the amount of damage to an unused digital model of the cutter. The instructions to determine the condition of each cutter may include instructions to indicate an amount of damage of the identified cutters.

The instructions may include instructions to determine the condition of any portion of the drill bit, such as the blades, the junks slots, the threaded connection, etc. Such determination may be carried out similarly to the determinations of the cutters disclosed above, such as to determine wear, breakage, corrosion, or the like. Such determinations may also be made using differential analysis by comparing the imaged portions of the used drill bit to a model of an unused drill bit or portions there. In an embodiment, determining the condition of a portion of the drill bit may include determining a quantity of one or more nozzle cavities or one or more nozzles disposed in the nozzle cavities. Determining the quantity of the one or more nozzle cavities or nozzles may indicate if one or more nozzle cavities or nozzles are obstructed when the detected quantity of nozzle cavities or nozzles is less than expected. In an embodiment, determining the condition of a portion of the drill bit may include determining whether the drill bit includes one or more nozzle losses. Nozzle loss is when a nozzle disposed in (e.g., threadedly attached or press-fitted to) the nozzle cavity is missing. Nozzle loss may occurs when the nozzle becomes dislodged or is worn away. Detecting nozzle loss may indicate that the drill bit requires servicing to replace the nozzle. In an embodiment, determining the condition of a portion of the drill bit may include examining the nozzles to determine if at least a portion of the nozzle is clogged. Detecting that at least a portion of a nozzle is obstructed may indicate that the drill bit requires cleaning prior to using the drill bit. In an embodiment, determining the condition of a portion of the drill bit may include determining the presence of one or more bit balled faults on the drill bit. Bit balled faults include material that is disposed on and remains attached to portions of the drill bit, such as the in the junk slots. The bit balled faults may inhibit the ability of the drill bit to drill. Detecting the bit balled faults may indicate that the drill bit requires cleaning or machining to removing the bit balled faults prior to using the drill bit. In an embodiment, determining the condition of a portion of the drill bit may include determining the presence of a bit core fault. A bit core fault occurs when a central portion of the drill bit or the cutters adjacent to the central portion of the drill bit breakoff or otherwise fail. The bit core fault may result in a hole in the central portion of the drill bit due to excessive wear. Detecting the bit core fault may require repairing of the drill bit. In an embodiment, determining the condition of a portion of the drill bit may include determining a presence of one or more bit ring outs. Bit ring outs occur when one of the cutters delaminates, is demolished, or is otherwise lost. The delaminated, demolished, or otherwise lost cutter may increase the stresses to circumferentially adjacent cutters which increases the likelihood that such circumferentially adjacent cutters become delaminated, demolished, or otherwise lost. The delaminate, demolished, or otherwise lost cutters also results in excessive wear of portions of the drill bit body that are circumferentially adjacent to the delaminated, demolished, or otherwise lost cutters. Detecting big ring out may indicate that the drill bit requires repair. It is noted that the useful predicted life of the drill bit may be decreased when any of the above faults are detected.

The machine readable and executable instructions may include forming a containing ring around the drill bit. The containing ring may be a best fit circumference of a circle that would pass through or contact the extreme points of the blades as seen from the top view of the bit. The instructions may include at least one of measuring the containing ring (e.g., determining a diameter or circumference of the containing ring) or adding the containing ring to the three-dimensional model provided to a user. The instructions may also include using the containing ring to calculate wear on the drill bit. In an example, the containing ring formed by the instructions may be different than an original containing ring of the drill bit prior to using the drill bit and the differences between the two containing rings may indicate the wear on the drill bit. In an example, the containing ring formed by the instructions may be spaced from or pass through more of a blade than expected which may indicate wear on the blade or another blade. In an example, the containing ring may be off-centered relative to the longitudinal axis of the drill bit which may indicate wear on the drill bit.

The machine readable and executable instructions may include instructions to exclude one or more elements in the background of the time-of-flight data and the color images from the analysis. For example, the drill bit may be analyzed on site at a location that includes a plurality of drill bits, such as the drill bit being analyzed and one or more background drill bits. In such an example, the instructions may include excluding the one or more background drill bits. In an embodiment, the image processor (e.g., machine learning modules) may be unable to distinguish between the drill bit being analyzed and the background drill bits using the color images since the drill bit being analyzed and the background drill bits may exhibit the same or similar colors, components, etc. The time-of-flight data, unlike the color images, may indicate which data (e.g., which portions of the color image) are associated with the drill bit being examined and the background drill bits. For example, the time-of-flight data may indicate that the drill bit being examined is spaced from the ranging imaging device by a first distance and the background drill bit is spaced from the ranging imaging device by a second distance. It is noted that the first and second distances may be ranges since drill bits are not flat. The background drill bits may be excluded since the second distance is sufficiently different from the first distance that the background drill bits may be distinguished from the drill bit being examined. In an embodiment, the instructions may include a threshold value which is a particular distance from the ranging imaging device or a particular difference between the first and second distances. A second distance or a different between the first and second distances that is greater than the threshold value may be automatically excluded. In an embodiment, the instructions may include identifying the background drill bits such that the time-of-flight data or color image of the background drill bits may be used when modeling the background drill bit. For example, the instructions may include detecting the number of blades, the number of cutters, the geometry of the background drill bits, or any other features and compare the features to drill bits previously modeled or modeled in the future.

The machine readable and executable instructions may include instructions to calculate a remaining useful life and robustness of the drill bit or one or more components thereof (e.g., cutters). Any of the damage states disclosed herein may be used to determine an approximate useful life of the drill bit or a portion thereof. For example, instructions may include instruction to calculate an amount of wear and determine an expected amount of drill time left on a cutter. In such examples, a drill time on the as-used cutter, the location of the drill site, the drill feed rate and rotational speed, type of rock being drilled, type of drilling fluid, or like may be provided from the driller, which may be used to calculate an amount of useful life left on the cutter in anticipated drilling conditions (which may be the same, or different from, those already experienced by the drill bit). The instructions may instruct the computing device to perform the calculation based on formation type (e.g., type of rock) being drilled, location of drill site, drill feed rates and rotational speeds, type of drilling fluid, or other variables. The machine readable and executable instructions may include instructions to calculate an expected performance and efficiency of the drill bit based on the drill feed rate and rotational speed, type of rock being drilled, type of drilling fluid, or the like.

The machine readable and executable instructions include instructions to provide a report to the requestor. The report may include indications of the conditions of the components of the drill bit and recommend a course of action based on the determined condition of one or more components of the drill bit. In an example, the indications of the conditions of the components of the drill bit may include identifying, quantifying (e.g., wear percentage, size of cracks, etc.), classifying, or providing a location of one or more faults (e.g., spalling, wear, delamination, breakage, erosion, cracks, side cracks, nozzle losses, clogged nozzles, bit balled faults, bit cored faults, or bit ring outs) on any portion of the drill bit, such as one or more blades or cutters of the drill bit. For example, the course of action may be to recommend to the user to replace one or more portions of the drill bit, such as one or more specific cutters on the drill bit. The course of action may include repairing one or more portions of the drill bit. The course of action may include which tools to use when replacing or repairing one or more portions of the drill bit. The course of action may be to recommend to continue using the drill bit for an amount of time calculated to be the useful life of the drill bit or one or more components thereof. In some examples, the computing device 120 may store threshold values of wear, spalling, cracking, breakage, etc. below which or above which (depending upon the damage type) a recommendation for replacement or a set amount of time is determined to be the recommendation for the component(s). For example, the computing device 120 may compare the values of wear on a modeled cutter to a table of expected values corresponding to wear amounts stored in the computing device in order to determine an expected useful life of the modeled cutter. Similar comparisons may be made for any damage type of the cutters or other drill bit components. The report may include indications of the amount of life left on one or more portions of the drill bit as a percentage, available drill time indication, available drill distance indication, or the like.

In an embodiment, the report may include images or at least a portion of the three-dimension model. In such an embodiment, the report may include a color overlay over one or more portions of the provided images or the three-dimension model. In an example, the images or the three-dimension model included in the report may include top view of the drill bit. The color overlay may indicate different portions of the drill bit, such as the at least one of the blades, the junks slots, or the nozzles of the drill bit since such features may be difficult to distinguish from each other in the top view of the drill bit. In an example, the images or three-dimensional model provided in the report may include a color overlay indicating a fault in the drill bit. In an example, the report may include one or more boundary boxes, such as boundary boxes indicating PDCs or PCD tables, instead of a color overlay. In an example, the report may include a depth map instead of or in addition to the color overlay.

The report may include a mechanical specific energy/efficiency of the drill bit, a cost (escalation) per foot drilled based on the damage state of the drill or portions thereof, a calculation of side forces/penetrating and drag forces on the drill bit, wear rates, volumetric wear, or the like. Any of the report information may be determined by the computing device by analyzing the damage state and comparing the damage state to the drill data associated therewith. For example, an analysis module in the computing device may correlate the amount of wear on cutting elements with one or more of a location of drilling, the distance drilled, and the time of drilling, to provide a cost per foot drilled or a wear rate of the cutters on the drill bit.

The instructions of the analysis module may include machine readable instructions to send the report to the driller. For example, the recommended course of action may be sent to the electronic device 110 at the drill site or to the client computer 140 from the computing device 120.

The machine readable and executable instructions may include instructions to catalogue the analysis and data corresponding to the digital model, including the images, on the computing device 120 for later use. Data corresponding to the digital model may be provided by the requestor. Such data may include the time of use of the drill bit, the location of use of the drill bit, the types of cutters on the drill bit such as composition and formation process information of the PDC, the type of drill rig, the time of year of the drilling, the type of drilling fluid used, the feed rate and/or rotation rate of the drill bit during use, or any other data associated with the use of the drill bit. Such data may be correlated to later outputs of the analyses of the digital model, such as the recommendations or status reports. Accordingly, the computing device 120 may perform machine learning on stored data to refine analyses of digital models as the database of stored data grows larger.

The machine learning may be carried out by the computing device 120 or another computing device in communication therewith. The computing device 120 may include a machine learning module (e.g., a deep neural network) programmed to perform machine learning tasks. Machine learning may include comparing one or more of: damage types, damage amounts, drill use times, drill bit types, drill bit shapes, cutter types, cutter shapes, drilling substrate types (e.g., rock types), drilling fluid types and/or amounts used, drill feed rates, drill rotational rates, drill site locations, or any other data that may be beneficial in determining how a selected drill bit type, drill bit shape, cutter type (e.g., PDC composition and/or formation method), cutter shape, or the like, performs during use. Such a performance determination may be how long, while in service, until cutters or the drill bit sustains damage, how long the drill bit or cutters thereon are expected to last in a selected location or rock type under certain drilling conditions, or any other type of inferred performance characteristics corresponding to a selected set of condition. The machine learning may also predict damage types that are anticipated to occur in certain types of substrates when using selected cutter types or shapes. For example, based on comparing data received from a plurality of drills, the machine learning module (or the analysis module in communication with the machine learning module) of the computing system may determine that spalling is more likely when using a first cutter type in a first rock type than when using a second cutter type. The outputs of the machine learning module may be used to determine and provide recommendations to drillers, such as via the analysis module.

The machine learning module may include instructions to perturb images or models provided to the system to make training materials in the system. The images may be correlated with corresponding damage conditions of the imaged drill tool and components thereof. To make training images, the machine learning module may change one or more dimensions of the digital model of the drill bit or portions thereof. The machine learning module may include instructions to correlate color images with the corresponding digital models and damage conditions provided to the system. The color images or the digital model may be changed in one or more portions in one or more aspects (e.g., dimensions, color, etc.) to make training materials in the system. The system may learn to recognize the previously determined damage conditions in the perturbed color images or the digital model. Accordingly, fewer actual images and models may be used to provide a large amount of training data.

Further, the machine learning module may include instructions to correlate color and depth data from images or digital models to various materials of the components thereof. For example, the color or even a fluorescence property of high-pressure high-temperature (HPHT) diamond may be used to distinguish polycrystalline diamond of a cutting element from a substrate of the cutting element by analyzing the color or fluorescence of two sequential fast mode captured images—e.g., one with no-flash and the other with flash on. By perturbing the color or fluorescent properties of the images, training images may be produced to train the machine learning module to correlate the materials to the specific regions of the images or models.

The machine learning module, in conjunction with an image processing module in the computing device, may be used in association with the depth data (e.g., time-of-flight images) and the non-depth data (e.g., color images) to recognize the amount and profile of damage on the drill bit. Such data may be used to classify the various damage modes and provide recommendations for the drill bit.

The machine learning module may include instructions to correlate the performance of certain types of drill bits (e.g., types or shapes) or cutters (e.g., composition, shape, or formation type) with performance thereof. For example, the machine readable and executable instructions may include instructions to analyze all drilling data of a selected type (e.g., cutter type, drilling location, rock type, etc.) with the corresponding outcomes of said data such as damage states, report data, recommendations, etc. to infer which drill bits or cutters perform best in selected rock types, drilling conditions, or locations. The machine learning module may correlate data from data logs of drill bit runs (e.g., drilling depth, vibrations, RPMs, rate of penetration, unconfined compressive strength, confined compressive strength, weight on bit, torque on bit, vibration, drilling time, fluid use, or other drilling data) with the current computed condition and analysis of the corresponding drill bit to determine which part of cutting elements may have worn or have been deformed at a higher rate than an average across similar drill bits and drilling data. Such analyses may be used to identify underperforming products and to provide recommendations to drillers for improving their performance, such as which drill bits and cutters perform best in selected locations. Conversely, the analyses may be used to provide, to drill bit or cutter manufactures, information to improve their products, such as which types of cutters perform best in certain rock types. The manufacturers may use the analyses to refine and improve their products, such as by honing in on damage states corresponding to specific drilling conditions and adjusting their products to address the underlying causes.

The machine learning module (e.g., deep neural network) that has been trained earlier on the various conditions and states of the drill bit may be used to infer, determine, or even predict the damage state of a drill bit or components thereof. For example, drill log data (e.g., time drilling, feed rate, rotation rate, vertical load, etc.) may be correlated with the digital model (e.g., damage states) to infer information therefrom, such as to predict an amount of damage of a drill bit or cutters thereon based on one or more drilling conditions, such as location, rock type, rotational speed, etc. The analysis module, in combination with the machine learning module, may calculate one or more forces on a digital model of a cutter from the damage state thereof, and may further use such calculated forces to recommend one or more changes to the drill bit, such as shape, number of blades, cutter positioning, cutter type, etc.

An analysis module, in communication with the machine learning module, may build a cutting element interaction plot, such that the wear contours are profiled for discretized segmental analysis to compute for a rotation at a given depth of cut. The cutting element face area and wear flat area participating for each cutting element for removal of formation may be calculated. The cutting face area and wear flat area may be utilized to compute various forces required or generated at the cutting element. Parameters that may be computed include a total volume of diamond table that is available or worn, wear rate, required weight or torque on the drill bit, drill bit performance, mechanical specific efficiency, and other computation results.

The computer device 120 may output recommendations to improve drill bits or cutters thereon such as recommending additional (or fewer) blades, additional (or fewer) cutters, repositioning cutters, change in type of cutters, increase in diamond table thickness, different diamond table formation techniques (e.g., higher sintering temperatures), or other parameters. The computer system may be programmed to create a three-dimensional digital model of a modified drill bit as a recommendation.

The systems and techniques disclosed herein provide a constantly improving artificial intelligence approach to generating a digital model of the drill bit based on the plurality of images and evaluating the digital model, as disclosed herein. The machine learning module may be used to perform any of the machine readable and executable instructions disclosed herein. The outcomes, conclusions, and inferences determined with the machine learning module may be available or output to the analysis module for evaluating the digital model. While various modules with different functions and machine readable and executable instructions are disclosed herein, the modules may be part of an overall set of machine readable and executable instructions to perform any of the functions disclosed herein.

FIG. 12 is a flow chart of a method 1200 for evaluating drill bits at a site of a drilling rig, according to an embodiment. The method 1200 includes, at block 1210, receiving, from a requestor, a plurality of images of a drill bit that has been used in a drilling operation, at least some of the plurality of images including time-of-flight images that have been captured by an electronic device on-site at or near a drill rig; at block 1220, generating a digital model of the drill bit based on the plurality of images; at block 1230, evaluating the digital model with a computing device programmed to identify each cutter of a plurality of cutters carried by the drill bit and determine a condition of at least one cutter of the plurality of cutters; and at block 1240, outputting the determined condition of the at least one cutter to the requestor. The method 1200 may include more blocks, fewer blocks, some of the blocks may be split, or some of the blocks may be combined into a single block.

Referring to block 1210, receiving, from a requestor, a plurality of images of a drill bit that has been used in a drilling operation, at least some of the plurality of images including time-of-flight images that have been captured by an electronic device on-site at or near a drill rig includes receiving images from a plurality of points of view of the drill bit (e.g., multiple views of the drill bit from a plurality of angles). The plurality of images may include color images captured without a flash, color images captured with a flash, and time-of-flight images, as disclosed herein. The plurality of images may be received in any of the formats disclosed herein. The plurality of images may include image data such as depth data, color data, or orientation data.

Receiving, from a requestor, a plurality of images of a drill bit that has been used may include receiving the images over a wireless network, such as a cellular network, Wi-Fi network, or any other network.

Referring to block 1220, generating a digital model of the drill bit based on the plurality of images may include utilizing an image processing module as disclosed herein. Generating a digital model of the drill bit based on the plurality of images may include combining image data from the plurality of images to form a three-dimensional model of the drill bit utilizing one or more of depth data provided by the time-of-flight images and color data provided by the color images. Generating a digital model of the drill bit based on the plurality of images may include fitting one or more structures in a first image with one or more structures from at least a second image to form the three-dimensional model of the drill bit. Generating a digital model of the drill bit based on the plurality of images may include fitting pixels of the one or more structures in a first image with pixels of the one or more structures from at least a second image to form the three-dimensional model of the drill bit. The digital model may be a complete or incomplete model of the surfaces of the drill bit. The digital model may be stored in a selected format, such as any of the formats disclosed herein (e.g., STL file).

Generating a digital model of the drill bit based on the plurality of images may include utilizing any of the machine readable and executable instructions disclosed herein.

Referring to block 1230, evaluating the digital model with a computing device programmed to identify each cutter of a plurality of cutters carried by the drill bit includes identifying, with the computing device, each cutter of the plurality of cutters in the digital model. Identifying may be carried out according to any of the machine readable and executable instructions disclosed herein. For example, an image processing module (e.g., analysis module) in the computing device may be used to identify each cutter of the plurality of cutters. In some examples, only some of the cutters (e.g., at least one) may be identified. For example, only some of the cutters may be captured in the images. In such instances, the digital model may be generated with only some of the cutters therein and at least one of the cutters in the digital model may be identified and analyzed as disclosed herein.

Evaluating the digital model may include comparing, with the computing device, the drill bit or portions thereof to a model of an unused version of the drill bit or portion thereof. For example, evaluating the digital model may include comparing, with the computing device, at least one identified cutter of the plurality of cutters to a model of an unused version of the at least one identified cutter. Evaluating the digital model with a computing device may include determining if one or more of spalling, wear, cracking, delamination, breakage, corrosion, or other damage states are present in structures in the digital model. The digital model may be evaluated for an extent of the damage state, such as volume of wear or breakage, amount of cracking, amount of spalling, or the like. Any of the determinations may be carried out by differential analysis using a model of an unused drill bit or portions thereof.

Evaluating the digital model with a computing device may include determining an expected usable life of the drill bit or portions thereof (e.g., cutters), determining if cutters should be replaced, determining a type of drill bit or cutter that would perform better under the same conditions, or any other of the determinations disclosed herein. The evaluations may be carried out by the analysis module as disclosed herein, such as in conjunction with the machine learning module. Evaluating the digital model may include utilizing any of the machine readable and executable instructions disclosed herein.

Evaluating the digital model may include utilizing drilling data to determine one or more recommendations, such as an expected lift of the drill bit or portions thereof, replacement of cutters; wear, breakage, cracking, or other damage rates; suggestions for improved drill bit or cutter types, or any other recommendations disclosed herein. The recommendations may include any of the outcomes of the analyses disclosed herein.

Referring to block 1240, outputting the determined condition of the at least one cutter to the requestor may include outputting an indication of an extent of damage such as spalling, wear, cracking, delamination, breakage, or corrosion of the at least one cutter, to the requestor (e.g., driller). Outputting the determined condition of the at least one cutter may include outputting the determined condition to the electronic device, a client computer, or a database for later use by the computing device. Outputting the determined condition of the at least one cutter may include outputting the determined condition via a wireless network.

The method 1200 may include outputting an expected life of at least one cutter based on the determined condition of the at least one cutter. The method 1200 may include using machine learning to train the computing device to generate the three-dimensional digital model and evaluate the digital model as disclosed herein.

FIG. 13 is a flow chart of a method 1300 for evaluating drill bits at a site of a drilling rig, according to an embodiment. The method 1300 includes, at block 1310, capturing a plurality of images of a drill bit that has been used, at least some of the plurality of images including time-of-flight images that have been captured by an electronic device; at block 1320, outputting the plurality of images to an image processor for generating a digital model of the drill bit based on the plurality of images, and evaluating the digital model with a processing element programmed to identify each cutter of a plurality of cutters carried by the drill bit and determine a condition of each cutter; and at block 1330, receiving the determined condition of at least one cutter on the drill bit from the image processor. The method 1300 may include more acts, fewer acts, or some of the acts may be combined into a single block.

Referring to block 1310, capturing a plurality of images of a drill bit that has been used, at least some of the plurality of images including time-of-flight images that have been captured by an electronic device includes capturing time-of-flight and color images. The electronic device may include any of the electronic devices, including cellular devices, disclosed herein. The plurality of images may include color images captured without a flash, color images captured with a flash, and time-of-flight images. The color and time-of-flight images may be captures simultaneously or in quick succession such as akin to the fast mode images disclosed below. Capturing a plurality of images of a drill bit that has been used may include capturing fast mode color images of the drill bit, one with a flash and one without a flash. The fast mode images may be captured within one second of each other, such as within 0.001 second to one second of each other.

Capturing a plurality of images of a drill bit that has been used may include capturing the plurality of images from a plurality of points of view (e.g., angles) of the drill bit. For example, the images may be captured from enough angles to provide a view of at least some or all of the surfaces of the drill bit (or portions thereof). In some examples, the plurality of images may not necessarily include images of all portions of the drill bit.

Referring to block 1320, outputting the plurality of images to an image processor for generating a digital model of the drill bit based on the plurality of images and evaluating the digital model with a processing element programmed to identify each cutter of a plurality of cutters carried by the drill bit and determine a condition of at least one cutter may include sending the images to a computing device with an image processor stored therein. Outputting the plurality of images includes outputting the images from the field, such as from the drill site where the images are captured. Outputting the plurality of images includes outputting the plurality of images from the electronic device, such as via a wireless network (e.g., Wi-Fi, Bluetooth, 4G, 5G, etc. network). For example, the plurality of images may be e-mailed to the computing device having the image processor over a cellular network. The computing device may include any of the computing devices disclosed herein.

The computing device having the image processor includes machine readable and executable instructions for generating a digital model of the drill bit based on the plurality of images as disclosed herein. For example, generating a digital model of the drill bit based on the plurality of images includes combining image data from the plurality of images to form a three-dimensional model of the drill bit utilizing one or more of depth data provided by the time-of-flight images or color data from color images.

The computing device having the image processor includes machine readable and executable instructions for evaluating the digital model to identify each portion of the drill bit as disclosed herein. For example, the instructions includes instructions for evaluating the digital model with a computing device programmed to identify each cutter of a plurality of cutters carried by the drill bit includes identifying, with the computing device, each cutter of the plurality of cutters in the digital model. In some examples, the instructions include instructions to identify at least some of the cutters of the plurality of cutters carried by the drill bit. For example, only some of the cutters on a drill bit may be captured in the digital images, and the instructions may provide for creation and analysis of a digital model when only some of the cutters are visible in the images. The instructions for evaluating the digital model, with the computing device, include instructions for determining a condition of at least some (e.g., each) portion of the digital model of the drill bit, such as each cutter thereon. For example, the instructions for evaluating the digital model with a computing device includes instructions for determining, with the computing device, if one or more damage states are present in the digital model as disclosed herein, such as one or more of spalling, wear, cracking, delamination, breakage, or corrosion.

The computing device may include machine readable and executable instructions to provide a report or notice to the requestor containing any of the determined conditions, recommendations, or outputs disclosed herein. Such report may be provided to the requestor via the wireless connection, such as a network.

Referring to block 1330, receiving the determined condition of at least one cutter from the image processor may include receiving the determined condition from the computing device with the image processor stored thereon. Receiving the determined condition of at least one cutter from the image processor may include receiving the determined condition with the electronic device or a client computer of the requestor as disclosed herein. Receiving the determined condition of at least one cutter from the image processor may include receiving an indication of an extent of the damage conditions of the at least one cutter, such as spalling, wear, cracking, delamination, breakage, or corrosion.

The method 1300 may include receiving, from the image processor, an expected life of the drill bit or a portion thereof based on the determined condition of the drill bit or a portion thereof. For example, the method 1300 may include receiving, from the image processor, an expected life of at least one cutter of the plurality of cutters based on the determined condition of the at least one cutter.

The method 1300 may include changing the drill bit responsive to receiving the determined condition of the drill bit or a portion thereof. The method 1300 may include changing the at least one cutter on the drill bit responsive to receiving the determined condition of the at least one cutter.

It should be understood that the methods and techniques disclosed herein may be utilized to create and analyze less than complete digital models of drill bits similarly or identically to those disclosed herein with respect to the methods 1200 and 1300. For example, images of a drill bit may omit some regions thereon. In such instances, the methods and techniques disclosed herein may be utilized to create an incomplete digital model and evaluate the components therein to determine conditions of the drill bit or components thereof to provide outputs to the requestor.

Figure 14:
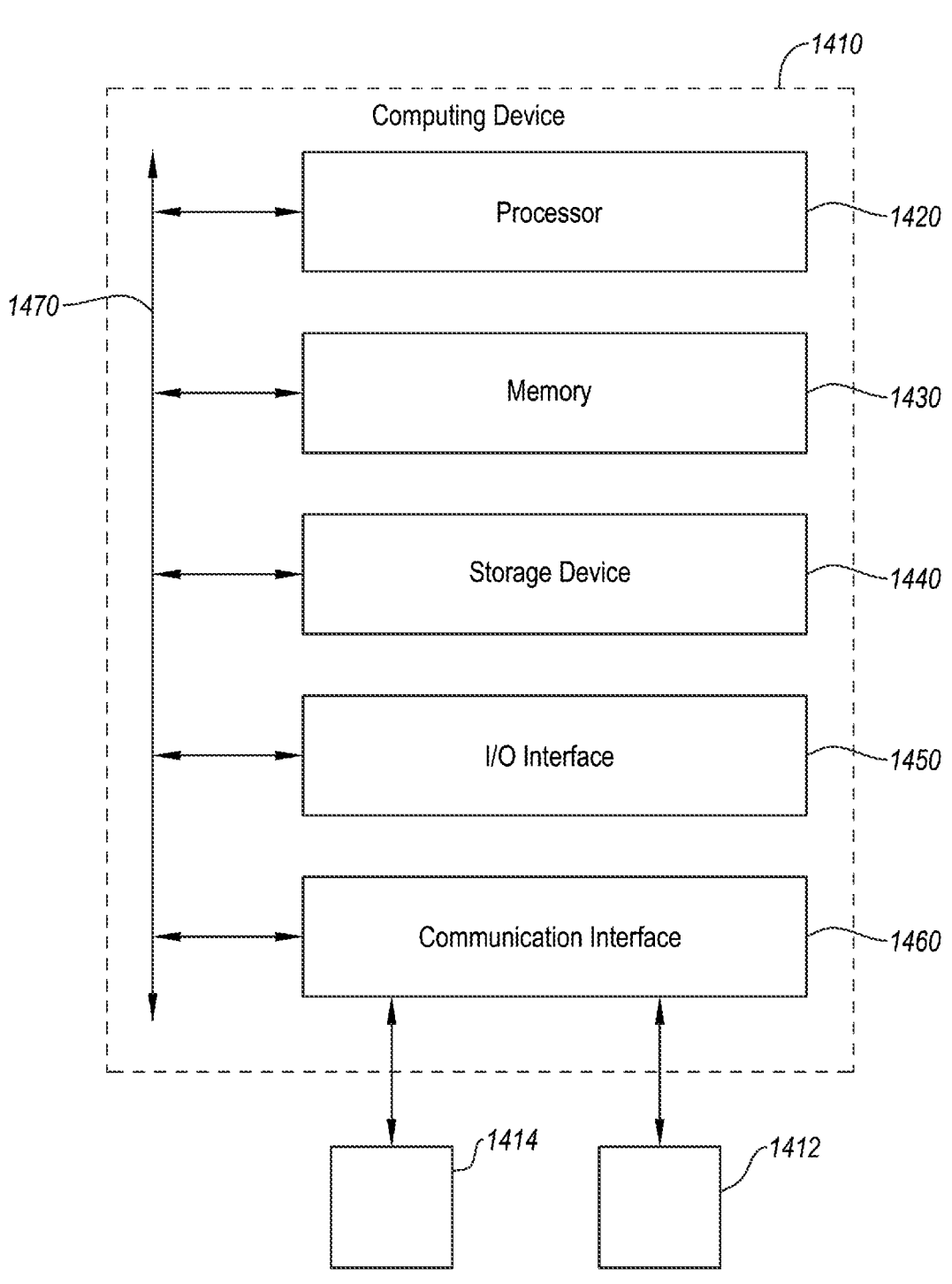
FIG. 14 is a schematic of a computer system for executing any of the example methods disclosed herein, according to an embodiment.

Any of the example systems disclosed herein may be used to carry out one or more portions of any of the example methods disclosed herein. FIG. 14 is a schematic of a computer system 1400 for executing any of the example methods disclosed herein, according to an embodiment. The computer system 1400 may be configured to implement any of the example methods disclosed herein, such as the method 1200 or 1300. The computer system 1400 may be configured as at least one computing device 1410. The at least one computing device 1410 is an exemplary computing device that may be configured to perform one or more of the acts described above, such as the method 1200 or 1300. The at least one computing device 1410 can include one or more servers, one or more computers (e.g., desk-top computer, lap-top computer), or one or more mobile computing devices (e.g., smartphone, tablet, etc.). The computing device 1410 can comprise at least one processor 1420, memory 1430, a storage device 1440, an input/output ("I/O") device/interface 1450, and a communication interface 1460. While an example computing device 1410 is shown in FIG. 14, the components illustrated in FIG. 14 are not intended to be limiting of the computer system 1400 or computing device 1410. Additional or alternative components may be used in some examples. Further, in some examples, the computer system 1400 or the computing device 1410 can include fewer components than those shown in FIG. 14. For example, the computer system 1400 may not include the one or more additional computing devices 1412 or 1414. In such examples, the computer system includes the computing device 1410, the additional computing device 1412 (e.g., cellular device), and the additional computing device 1414 (e.g., client computer). The computing devices 1410, 1412, and 1414 may be operably coupled via one or more networks such as a wireless network. In some examples, the at least one computing device 1410 may include a plurality of computing devices, such as a server farm, computational network, or cluster of computing devices. Components of computing device 1410 shown in FIG. 14 are described in additional detail below.

In some examples, the processor(s) 1420 includes hardware for executing instructions (e.g., instructions for carrying out one or more portions of any of the methods disclosed herein), such as those making up a computer program. For example, to execute instructions, the processor(s) 1420 may retrieve (or fetch) the instructions from an internal register, an internal cache, the memory 1430, or a storage device 1440 and decode and execute them. In particular examples, processor(s) 1420 may include one or more internal caches for data such as look-up tables. As an example, the processor(s) 1420 may include one or more instruction caches, one or more data caches, and one or more translation lookaside buffers (TLBs). Instructions in the instruction caches may be copies of instructions in memory 1430 or storage device 1440. In some examples, the processor 1420 may be configured (e.g., include programming stored thereon or executed thereby) to carry out one or more portions of any of the example methods disclosed herein.

In some examples, the processor 1420 is configured to perform any of the acts disclosed herein such as in method 1200 or 1300 or cause one or more portions of the computing device 1410 or computer system 1400 to perform at least one of the acts disclosed herein. Such configuration can include one or more operational programs (e.g., computer program products) that are executable by the at least one processor 1420. For example, the processor 1420 may be configured to automatically generate a digital model or evaluate a digital model as disclosed herein.

The at least one computing device 1410 (e.g., a server) may include at least one memory storage medium (e.g., memory 1430 and/or storage device 1440). The computing device 1410 may include memory 1430, which is operably coupled to the processor(s) 1420. The memory 1430 may be used for storing data, metadata, and programs for execution by the processor(s) 1420. The memory 1430 may include one or more of volatile and non-volatile memories, such as Random Access Memory (RAM), Read Only Memory (ROM), a solid state disk (SSD), Flash, Phase Change Memory (PCM), or other types of data storage. The memory 1430 may be internal or distributed memory.

The computing device 1410 may include the storage device 1440 having storage for storing data or instructions. The storage device 1440 may be operably coupled to the at least one processor 1420. In some examples, the storage device 1440 can comprise a non-transitory memory storage medium, such as any of those described above. The storage device 1440 (e.g., non-transitory storage medium) may include a hard disk drive (HDD), a floppy disk drive, flash memory, an optical disc, a magneto-optical disc, magnetic tape, or a Universal Serial Bus (USB) drive or a combination of two or more of these. Storage device 1440 may include removable or non-removable (or fixed) media. Storage device 1440 may be internal or external to the computing device 1410. In some examples, storage device 1440 may include non-volatile, solid-state memory. In some examples, storage device 1440 may include read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these. In some examples, one or more portions of the memory 1430 and/or storage device 1440 (e.g., memory storage medium(s)) may store one or more databases thereon. At least some of the databases may be used to store one or more of digital models, analyses, reports, drilling data, or any other data, as disclosed herein.

In some examples, the machine readable and executable instructions disclosed herein, the digital models, analyses, reports, drilling data, or any other data, may be stored in a memory storage medium such as one or more of the at least one processor 1420 (e.g., internal cache of the processor), memory 1430, or the storage device 1440. In some examples, the at least one processor 1420 may be configured to access (e.g., via bus 1470) the memory storage medium(s) such as one or more of the memory 1430 or the storage device 1440. For example, the at least one processor 1420 may receive and store the data (e.g., look-up tables) as a plurality of data points in the memory storage medium(s).

The at least one processor 1420 may execute programming (e.g., machine readable and executable instructions) stored therein adapted access the data in the memory storage medium(s) to automatically. For example, the at least one processor 1420 may access one or more look-up tables in the memory storage medium(s) such as memory 1430 or storage device 1440.

The computing device 1410 also includes one or more I/O devices/interfaces 1450, which are provided to allow a user to provide input to, receive output from, and otherwise transfer data to and from the computing device 1410. These I/O devices/interfaces 1450 may include a mouse, keypad or a keyboard, a touch screen, camera, optical scanner, network interface, web-based access, modem, a port, other known I/O devices or a combination of such I/O devices/interfaces 1450. The touch screen may be activated with a stylus or a finger.

The I/O devices/interfaces 1450 may include one or more devices for presenting output to a user, including, but not limited to, a graphics engine, a display (e.g., a display screen or monitor), one or more output drivers (e.g., display drivers), one or more audio speakers, and one or more audio drivers. In certain examples, I/O devices/interfaces 1450 are configured to provide graphical data to a display for presentation to a user. The graphical data may be representative of one or more graphical user interfaces and/or any other graphical content as may serve a particular implementation.

The computing device 1410 can further include a communication interface 1460. The communication interface 1460 can include hardware, software, or both. The communication interface 1460 can provide one or more interfaces for communication (such as, for example, packet-based communication) between the computing device 1410 and one or more additional computing devices 1412 and 1414 or one or more networks. For example, communication interface 1460 may include a network interface controller (NIC) or network adapter for communicating with an Ethernet or other wire-based network or a wireless NIC (WNIC) or wireless adapter for communicating with a wireless network, such as a WI-FI or cellular network.

Any suitable network and any suitable communication interface 1460 may be used. For example, computing device 1410 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, one or more portions of computer system 1400 or computing device 1410 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1410 may include any suitable communication interface 560 for any of these networks, where appropriate.

The computing device 1410 may include a bus 1470. The bus 1470 can include hardware, software, or both that couples components of computing device 1410 to each other. For example, bus 1470 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

It should be appreciated that any of the examples of acts described herein, such as in the method 1200 or 1300 may be performed by and/or with the computing device 1410. The computing device 1410 or additional computing devices 1420 or 1430 may be used as the computer system 120 or the client computer 140. The electronic device 110 may include one or more components or functional equivalents thereof of the computing device 1410.

The computing devices, systems, and methods disclosed herein provide excellent inference with respect to computing three-dimensional geometric positions of various components of a drill bit, remove inference uncertainties due to background objects in the view of the camera, and make accurate analyses in different lighting conditions. The computing devices, systems, and methods disclosed herein also make available the large amount of training data required by the machine learning module to train the computing device to generate and evaluate the digital model.

While described herein with respect to drill bits and cutters thereon. The example systems and methods disclosed herein may be used to grade bearings and bearing pads thereon. In one embodiment, a rotor and a stator, assembled to form a thrust-bearing apparatus, may each include one or more PDCs configured according to any of the embodiments disclosed herein and may be operably assembled to a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing superabrasive compacts disclosed herein may be incorporated.

As used herein, the term "about" or "substantially" refers to an allowable variance of the term modified by "about" by +10% or +5%. Further, the terms "less than," "or less," "greater than", "more than," or "or more" include as an endpoint, the value that is modified by the terms "less than," "or less," "greater than," "more than," or "or more."

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A method for evaluating a drill bit, the method comprising:

receiving, from a requestor, a plurality of images of the drill bit that has been used in drilling a subterranean formation, at least some of the plurality of images including time-of-flight images that have been captured by an electronic device on-site at or near a drill rig;

generating a digital model of the drill bit based on the plurality of images;

evaluating the digital model with a computing device programmed to:

identify each cutter of a plurality of cutters carried by the drill bit;

differentiating between materials on the drill bit or components thereof;

determine an original radius of at least one cutter of the plurality of cutters using an unworn or substantially unworn portion of the at least one cutter;

analyzing the at least one cutter of the drill bit to determine a wear percentage of the at least one cutter by analyzing the at least one cutter to determine a variation between an original shape of the at least one cutter inferred from the original radius of the at least one cutter and a current shape of the at least one cutter; and determine a condition of the at least one cutter of the plurality of cutters; and outputting the determined condition of the at least one cutter to the requestor.

2. The method of claim 1 wherein receiving, from a requestor, a plurality of images of the drill bit includes receiving images from a plurality of points of view of the drill bit.

3. The method of claim 1 wherein the plurality of images additionally include color images captured without a flash and color images captured with a flash.

4. The method of claim 1 wherein generating a digital model of the drill bit based on the plurality of images includes combining image data from the plurality of images, including utilizing depth data provided by the time-of-flight images, to form a three-dimensional model of the drill bit.

5. The method of claim 1 wherein generating a digital model of the drill bit based on the plurality of images includes fitting pixels of one or more structures in a first image with pixels of the one or more structures from at least a second image to form the three-dimensional model of the drill bit.

6. The method of claim 1 wherein evaluating the digital model with a computing device programmed to determine a condition of at least one cutter includes comparing, with the computing device, at least one identified cutter of the plurality of cutters to a model of an unused version of the at least one identified cutter.

7. The method of claim 1 wherein evaluating the digital model with a computing device includes determining if one or more of spalling, wear, cracking, delamination, breakage, and corrosion are present in the digital model.

8. The method of claim 7 wherein outputting the determined condition of the at least one cutter to the requestor includes outputting an indication of an extent of one or more of spalling, wear, cracking, delamination, breakage, and corrosion of the at least one cutter.

9. The method of claim 1, further comprising outputting an expected life of the at least one cutter based on the determined condition of the at least one cutter.

10. The method of claim 1 wherein evaluating the digital model includes:

detecting one or more polycrystalline diamond compacts on one or more blades of the drill bit; and responsive to detecting the one or more polycrystalline diamond compacts, at least one of:

determining a position of the one or more polycrystalline diamond compacts relative to a rotational axis of the drill bit;

overlaying one or more boundary boxes over the one or more polycrystalline diamond compacts in at least one of the digital model or the one or more color images; or determining a probability score for the one or more polycrystalline diamond compacts, the probability score indicating the likelihood that the one or more polycrystalline diamond compact are correctly or erroneously detected as polycrystalline diamond compacts.

11. The method of claim 1 wherein evaluating the digital model includes recognizing the at least two of blades, junk slots, or nozzles of the drill bit using the time-of-flight data; and generating an image of the top of the drill bit to display, the image using at least one of a color overlay or depth map to distinguish the at least two of the blades, the junk slots, or the nozzles of the drill bit.

12. The method of claim 1 wherein generating the digital model of the drill bit includes excluding one or more background drill bits contained in the plurality of images.

13. The method of claim 1 wherein evaluating the digital model includes:

determining a first distance measured from the electronic device to a first blade of the drill bit to be detected using the time-of-flight data;

determining a second distance measured from the electronic device to a second blade of the drill bit using the time-of-flight data wherein the second blade is in the foreground or the background of the first blade and the second distance is different than the first distance; and distinguishing between the first blade and the second blades based on second distance being different than the first distance.

14. The method of claim 1 wherein the plurality of cutters include at least one polycrystalline diamond compact including a polycrystalline diamond table bonded to a substrate; and wherein evaluating the digital model includes determining a boundary of the polycrystalline diamond table.

15. The method of claim 1 wherein differentiating between materials on the drill bit or components thereof includes differentiating between a polycrystalline diamond table and a substrate attached to the polycrystalline diamond table.

16. A method for evaluating a drill bit, the method comprising:

capturing a plurality of images of the drill bit that has been used in drilling a subterranean formation, at least some of the plurality of images including time-of-flight images that have been captured by an electronic device, the at least some of the plurality of images including a first distance measured from the electronic device to a first blade of the drill bit using time-of-flight data and a second distance measured from the electronic device to a second blade of the drill bit using the time-of-flight data, wherein the second blade is in the foreground or the background of the first blade and the second distance is different than the first distance;

outputting the plurality of images to an image processor for:

generating a digital model of the drill bit based on the plurality of images; and evaluating the digital model with a processing element programmed to:

identify each cutter of a plurality of cutters carried by the drill bit;

differentiating between materials on the drill bit or components thereof;

distinguish between the first blade and the second blade based on the second distance being different than the first distance; and determine a condition of at least one cutter of the plurality of cutters; and receiving the determined condition of the at least one cutter from the image processor.

17. The method of claim 16 wherein evaluating the digital model includes determine an original radius of one or more cutters using an unworn or substantially unworn portion of the one or more cutters; and analyzing the one or more cutters of the drill bit to determine a wear percentage of the one or more cutters includes analyzing the one or more cutters to determine a variation between an original shape of the one or more cutters inferred from the original radius of the one or more cutters and a current shape of the one or more cutters.

18. A system for evaluating cutter wear, the system comprising:

a computing device having machine readable and executable instructions for:

receiving, from a requestor, a plurality of images of a drill bit that has been used in drilling a subterranean formation, at least some of the plurality of images including time-of-flight images that have been captured by an electronic device on-site at or near a drill rig;

generating a digital model of the drill bit based on the plurality of images;

evaluating the digital model with a computing device programmed to:

identify each cutter of a plurality of cutters carried by the drill bit;

differentiating between materials on the drill bit or components thereof;

determine an original radius of at least one cutter of the plurality of cutters using an unworn or substantially unworn portion of the at least one cutter;

analyzing the at least one cutter of the drill bit to determine a wear percentage of the at least one cutter by analyzing the at least one cutter to determine a variation between an original shape of the at least one cutter inferred from the original radius of the at least one cutter and a current shape of the at least one cutter; and determine a condition of the at least one cutter of the plurality of cutters; and outputting the determined condition of the at least one cutter to the requestor.

19. The system of claim 18 wherein the machine readable and executable instructions for generating a digital model of the drill bit based on the plurality of images include instructions for fitting pixels of one or more structures in a first image with pixels of the one or more structures from at least a second image to form a three-dimensional model of the drill bit.

20. The system of claim 18 wherein the machine readable and executable instructions for generating a digital model of the drill bit based on the plurality of images include instructions for combining image data from the plurality of images to form a three-dimensional model of the drill bit utilizing depth data provided by the time-of-flight images.

21. The system of claim 20 wherein the machine readable and executable instructions for evaluating the digital model with a computing device programmed to determine a condition of at least one cutter includes instructions for comparing, with the computing device, at least one identified cutter of the plurality of cutters to a model of an unused version of the at least one identified cutter.

22. The system of claim 18 wherein the machine readable and executable instructions for evaluating the digital model includes instructions for determining if one or more of spalling, wear, cracking, delamination, breakage, or corrosion are present in the digital model.

23. A system for evaluating wear of a drill bit, the system comprising:

a ranging imaging device configured to generate time-of-flight data, the ranging imaging device configured to detect a first distance measured from the ranging imaging device to a first blade of the drill bit using the time-of-flight data and a second distance measured from the electronic device to a second blade of the drill bit using the time-of-flight data, wherein the second blade is in the foreground or the background of the first blade and the second distance is different than the first distance;

a color camera configured to generate one or more color images;

one or more orientation sensors configured to determine an orientation of at least one of the ranging imaging device or the color camera;

a computing device including at least one processing element and machine readable and executable instructions, the machine readable and executable instructions for:

generating a digital model of the drill bit based on the time-of-flight data generated with the ranging imaging device and the one or more color images generated by the color camera;

distinguish between the first blade and the second blade based on the second distance being different than the first distance; and evaluating the digital model with a processing element using one or more machine learning modules by at least differentiating between materials on the drill bit or components thereof.

* * * * *